United States Patent
Bronnikov et al.

(10) Patent No.: US 9,672,106 B2
(45) Date of Patent: Jun. 6, 2017

(54) ARCHITECTURE FOR IMPLEMENTING ERASURE CODING

(71) Applicant: Nutanix, Inc., San Jose, CA (US)

(72) Inventors: Dmitri Bronnikov, Foster City, CA (US); Binny Sher Gill, San Jose, CA (US)

(73) Assignee: NUTANIX, INC., San Jose, CA (US)

(*) Notice: Subject to any disclaimer, the term of this patent is extended or adjusted under 35 U.S.C. 154(b) by 154 days.

(21) Appl. No.: 14/586,628

(22) Filed: Dec. 30, 2014

(65) Prior Publication Data

US 2016/0188407 A1 Jun. 30, 2016

(51) Int. Cl.
*G11C 29/00* (2006.01)
*G06F 11/10* (2006.01)

(52) U.S. Cl.
CPC ................. *G06F 11/1076* (2013.01)

(58) Field of Classification Search
CPC .................................. G06F 11/1076
See application file for complete search history.

(56) References Cited

U.S. PATENT DOCUMENTS

| | | | |
|---|---|---|---|
| 5,208,813 A | 5/1993 | Stallmo | |
| 5,235,601 A | 8/1993 | Stallmo et al. | |
| 5,390,187 A | 2/1995 | Stallmo | |
| 5,485,571 A | 1/1996 | Menon | |
| 5,513,192 A * | 4/1996 | Janku | G06F 11/1008 714/799 |
| 5,519,844 A | 5/1996 | Stallmo | |
| 5,522,032 A | 5/1996 | Franaszek et al. | |
| 5,537,567 A | 7/1996 | Galbraith et al. | |
| 5,550,849 A | 8/1996 | Harrington | |
| 5,613,059 A | 3/1997 | Stallmo et al. | |
| 5,617,530 A | 4/1997 | Stallmo et al. | |
| 5,708,769 A | 1/1998 | Stallmo | |

(Continued)

FOREIGN PATENT DOCUMENTS

| | | |
|---|---|---|
| EP | 1324200 A3 | 7/2003 |
| WO | WO 0229539 A2 | 4/2002 |

OTHER PUBLICATIONS

International Search Report and Written Opinion dated Mar. 29, 2016 for corresponding PCT Patent Application No. PCT/US2015/068162, 16 pages.

(Continued)

*Primary Examiner* — Sam Rizk
(74) *Attorney, Agent, or Firm* — Vista IP Law Group, LLP

(57) ABSTRACT

A method for implementing erasure coding, including identifying a plurality of storage units, determining a number of storage unit failures to be tolerated, organizing data within the plurality of storage units as a matrix of rows and columns for computing one or more parity data, configuring the matrix to include one or more additional rows having preset values, computing the one or more parity data from the matrix that corresponds to the number of storage unit failures to be tolerated, wherein the one or more parity data comprises a row parity, a first diagonal parity, and a second diagonal parity, wherein the one or more additional rows having the preset values are used to compute the first diagonal parity and the second diagonal parity; and wherein the first diagonal parity comprises a different slope from the second diagonal parity.

63 Claims, 50 Drawing Sheets

(56) References Cited

U.S. PATENT DOCUMENTS

| | | | |
|---|---|---|---|
| 5,737,744 | A | 4/1998 | Callison et al. |
| 5,761,402 | A | 6/1998 | Kaneda et al. |
| 5,862,158 | A | 1/1999 | Baylor et al. |
| 5,911,779 | A | 6/1999 | Stallmo et al. |
| 6,282,671 | B1 | 8/2001 | Islam et al. |
| 6,298,415 | B1 | 10/2001 | Riedle |
| 6,353,895 | B1 | 3/2002 | Stephenson |
| 6,871,317 | B1 | 3/2005 | Corbett |
| 7,080,278 | B1 | 7/2006 | Kleiman et al. |
| 7,162,684 | B2 | 1/2007 | Hocevar |
| 7,321,905 | B2 | 1/2008 | Hartline et al. |
| 8,549,518 | B1 | 10/2013 | Aron et al. |
| 8,601,473 | B1 | 12/2013 | Aron et al. |
| 8,850,130 | B1 | 9/2014 | Aron et al. |
| 2002/0194530 | A1 | 12/2002 | Santeler et al. |
| 2003/0126523 | A1 | 7/2003 | Corbett et al. |
| 2004/0148560 | A1 | 7/2004 | Hocevar |
| 2005/0160307 | A1 | 7/2005 | Schmisseur |
| 2007/0089045 | A1* | 4/2007 | Corbett ............... G06F 11/1076 714/801 |
| 2011/0010599 | A1 | 1/2011 | Goel et al. |
| 2014/0208022 | A1 | 7/2014 | Gordon |
| 2014/0372689 | A1 | 12/2014 | Colgrove et al. |

OTHER PUBLICATIONS

Tom Fuja et al., "Cross Parity Check Convolutional Codes," IEEE Transactions on Information Theory, vol. 35, No. 6, Nov. 1989.

\* cited by examiner

| $P_{Hor}$ | $P1_{Hor}$ | | | | | |
|---|---|---|---|---|---|---|
| 4 | V4-1 | V4-2 | V4-3 | V4-4 | 0 | 0 |
| 3 | V3-1 | V3-2 | V3-3 | V3-4 | 0 | 0 |
| 2 | V2-1 | V2-2 | V2-3 | V2-4 | 0 | 0 |
| 1 | V1-1 | V1-2 | V1-3 | V1-4 | 0 | 0 |

|   | $P_{Hor}$ | $P1_{Hor}$ | $P2_{Hor}$ |   |   |   |
|---|---|---|---|---|---|---|
| 4 | V4-1 | V4-2 | V4-3 | V4-4 | 0 | 0 |
| 3 | V3-1 | V3-2 | V3-3 | V3-4 | 0 | 0 |
| 2 | V2-1 | V2-2 | V2-3 | V2-4 | 0 | 0 |
| 1 | V1-1 | V1-2 | V1-3 | V1-4 | 0 | 0 |

| | 1 | 2 | 3 | 4 | $P_{Hor}$ |
|---|---|---|---|---|---|
| | V1-1 | V2-1 | V3-1 | V4-1 | $P1_{Hor}$ |
| | V1-2 | V2-2 | V3-2 | V4-2 | $P2_{Hor}$ |
| | V1-3 | V2-3 | V3-3 | V4-3 | $P3_{Hor}$ |
| | V1-4 | V2-4 | V3-4 | V4-4 | |
| | 0 | 0 | 0 | 0 | |
| | 0 | 0 | 0 | 0 | |

| | $P_{Hor}$ | $P1_{Hor}$ | $P2_{Hor}$ | $P3_{Hor}$ | $P4_{Hor}$ | | |
|---|---|---|---|---|---|---|---|
| 1 | 1 | V1-1 | V1-2 | V1-3 | V1-4 | 0 | 0 |
| 2 | 2 | V2-1 | V2-2 | V2-3 | V2-4 | 0 | 0 |
| 3 | 3 | V3-1 | V3-2 | V3-3 | V3-4 | 0 | 0 |
| 4 | 4 | V4-1 | V4-2 | V4-3 | V4-4 | 0 | 0 |

| $P_{Diag1}$ | $P1_{Diag1}$ | | | | | |
|---|---|---|---|---|---|---|
| 4 | V4-1 | V4-2 | V4-3 | V4-4 | 0 | 0 |
| 3 | V3-1 | V3-2 | V3-3 | V3-4 | 0 | 0 |
| 2 | V2-1 | V2-2 | V2-3 | V2-4 | 0 | 0 |
| 1 | V1-1 | V1-2 | V1-3 | V1-4 | 0 | 0 |

|   | $P_{Diag1}$ | $P1_{Diag1}$ | $P2_{Diag1}$ |      |   |   |
|---|------|------|------|------|---|---|
| 4 | V4-1 | V4-2 | V4-3 | V4-4 | 0 | 0 |
| 3 | V3-1 | V3-2 | V3-3 | V3-4 | 0 | 0 |
| 2 | V2-1 | V2-2 | V2-3 | V2-4 | 0 | 0 |
| 1 | V1-1 | V1-2 | V1-3 | V1-4 | 0 | 0 |

|  | $P_{Diag1}$ | $P1_{Diag1}$ | $P2_{Diag1}$ | $P3_{Diag1}$ | $P4_{Diag1}$ | $P5_{Diag1}$ | $P6_{Diag1}$ |
|---|---|---|---|---|---|---|---|
|  | 4 | V4-1 | V4-2 | V4-3 | V4-4 | 0 | 0 |
|  | 3 | V3-1 | V3-2 | V3-3 | V3-4 | 0 | 0 |
|  | 2 | V2-1 | V2-2 | V2-3 | V2-4 | 0 | 0 |
|  | 1 | V1-1 | V1-2 | V1-3 | V1-4 | 0 | 0 |

| $P_{Diag2}$ | $P1_{Diag2}$ |      |      |   |   |
|------|------|------|------|---|---|
| 4    | V4-1 | V4-2 | V4-3 | V4-4 | 0 | 0 |
| 3    | V3-1 | V3-2 | V3-3 | V3-4 | 0 | 0 |
| 2    | V2-1 | V2-2 | V2-3 | V2-4 | 0 | 0 |
| 1    | V1-1 | V1-2 | V1-3 | V1-4 | 0 | 0 |

|  $P_{Diag2}$ | $P1_{Diag2}$ | $P2_{Diag2}$ | $P3_{Diag2}$ | $P4_{Diag2}$ | $P5_{Diag2}$ | $P6_{Diag2}$ |
|---|---|---|---|---|---|---|
| 4 | V4-1 | V4-2 | V4-3 | V4-4 | 0 | 0 |
| 3 | V3-1 | V3-2 | V3-3 | V3-4 | 0 | 0 |
| 2 | V2-1 | V2-2 | V2-3 | V2-4 | 0 | 0 |
| 1 | V1-1 | V1-2 | V1-3 | V1-4 | 0 | 0 |

| | 1 | 2 | 3 | 4 | $P_{Hor}$ | $P_{Diag1}$ | $P_{Diag2}$ |
|---|---|---|---|---|---|---|---|
| 1 | ? | ? | ? | V4-1 | $P1_{Hor}$ | $P1_{Diag1}$ | $P1_{Diag2}$ |
| 2 | ? | ? | ? | V4-2 | $P2_{Hor}$ | $P2_{Diag1}$ | $P2_{Diag2}$ |
| 3 | ? | ? | ? | V4-3 | $P3_{Hor}$ | $P3_{Diag1}$ | $P3_{Diag2}$ |
| 4 | ? | ? | ? | V4-4 | $P4_{Hor}$ | $P4_{Diag1}$ | $P4_{Diag2}$ |
| 0 | 0 | 0 | 0 | 0 | $P5_{Hor}$ | $P5_{Diag1}$ | $P5_{Diag2}$ |
| 0 | 0 | 0 | 0 | 0 | $P6_{Hor}$ | $P6_{Diag1}$ | $P6_{Diag2}$ |

FIG. 11B

| Row/Column | 0 | 1 | 2 | 3 | 4 | 5 |
|---|---|---|---|---|---|---|
| 0 | 0 | 1 | 1 | 1 | 0 | 0 |
| 1 | 1 | 0 | 0 | 1 | 1 | 1 |
| ⋮ | ⋮ | ⋮ | ⋮ | ⋮ | ⋮ | ⋮ |
| M-2 | 1 | 0 | 0 | 1 | 1 | 0 |
| M-1 | 1 | 1 | 1 | 1 | 0 | 0 |

1902

| Row/Column | 0 | 1 | 2 | 3 | 4 | 5 | Ascending Diagonal Parity |
|---|---|---|---|---|---|---|---|
| ... | ... | ... | ... | ... | ... | ... | ... |
| 10 | 0 | 1 | 1 | 1 | 1 | 1 | 1 |
| 11 | 0 | 0 | 0 | 0 | 0 | 1 | X |
| 12 | 1 | 1 | 1 | 1 | 0 | 1 | X |
| 13 | 0 | 0 | 0 | 0 | 0 | 1 | X |
| 14 | 1 | 0 | 0 | 0 | 0 | 0 | X |
| 15 | 0 | 1 | 0 | 0 | 0 | 1 | X |
| 16 | 0 | 0 | 0 | 0 | 0 | 1 | X |
| ... | ... | ... | ... | ... | ... | ... | ... |

| Row/Column | 0 | 1 | 2 | 3 | 4 | 5 |
|---|---|---|---|---|---|---|
| 10 | 0 | | 1 | | 1 | |
| 11 | 0 | 1 | 0 | 1 | 0 | 1 |
| 12 | 1 | 0 | 1 | 0 | 1 | 1 |
| 13 | 0 | 0 | 0 | 0 | 0 | 0 |
| 14 | 1 | 1 | 0 | 0 | 0 | 1 |
| 15 | 0 | 0 | 0 | 0 | 0 | 1 |
| 16 | 0 | 1 | 0 | 0 | 0 | 1 |
| 17 | | | | | | |

| Row/Column | 0 | 1 | 2 | 3 | 4 | 5 | Ascending Diagonal Parity |
|---|---|---|---|---|---|---|---|
| ... | ... | ... | ... | ... | ... | ... | ... |
| 10 | 0 | 1 | 1 | | 1 | | 0 |
| 11 | 0 | 0 | 0 | | 0 | 0 | x |
| 12 | 1 | 0 | 1 | 0 | 1 | | x |
| 13 | 0 | 1 | 0 | 0 | 0 | 0 | x |
| 14 | 1 | 0 | 0 | 0 | 0 | 1 | x |
| 15 | 0 | | 0 | 1 | 0 | | x |
| 16 | 0 | | 0 | | 0 | | |
| 17 | ... | | | | | | |

| Row/Column | 0 | 1 | 2 | 3 | 4 | 5 | Descending Diagonal Parity |
|---|---|---|---|---|---|---|---|
| 10 | 0 | 0 | 1 | 1 | 1 | 0 | X |
| 11 | 0 | 0 | 0 | 1 | 0 | 1 | X |
| 12 | 1 | 1 | 1 | 0 | 1 | 1 | X |
| 13 | 0 | 0 | 0 | 0 | 0 | 0 | X |
| 14 | 1 | 1 | 0 | 0 | 0 | 1 | X |
| 15 | 0 | 0 | 0 | 0 | 0 | 1 | X |
| 16 | 0 | 0 | 0 | 0 | 0 | 0 | 0 |

ARCHITECTURE FOR IMPLEMENTING ERASURE CODING

BACKGROUND

Many storage systems generally require some form of redundancy to achieve fault tolerance. One possible approach to provide fault tolerance is by storing full size replicas of data blocks on independent units of failure. This method provides the highest degree of availability because it does not require reading from more than one storage location or data re-computation on failure. However, this approach is also very expensive because the space taken up by full size replicas is equal to the amount of user data per each added degree of fault tolerance.

Another possible approach is to implement erasure coding, which takes advantage of the fact that there are usually more available independent units of failure than the desired degree of fault tolerance. A common example of erasure coding in storage is known as RAID 4 (redundant array of independent disks level 4), where the results of performing an exclusive OR operation on data blocks are stored on all disks except that the parity disk is stored on the parity disk. In the event of a single disk failure, the lost data block is computed as the exclusive OR of all available data blocks, including the parity block. The amount of redundant data needed by RAID 4 is equal to 1/N of the amount of user data where N is an arbitrarily chosen number that is less than the number of independent disks. For example, if four disks are available in the system, the amount of redundant data needed for protection against one disk failure is equal to ⅓ of the amount of user data.

With erasure coding, it is much more expensive to assure protection against multiple disk failures with the conventional techniques. RAID 6 refers to a system that protects against at most two hardware failures at the expense of extra 2/N times the amount of user data. It is generally true that protecting again K hardware failures requires K/N extra space in an array of independent disks. The Reed-Solomon scheme corresponds to a class of erasure coding algorithms that can be used to protect against multi-disk failures. The problem is that these algorithms are very complicated to implement, require a significant number of operations to be performed, and are not very efficient either in terms of storage or the process to perform recovery after a failure.

Therefore, there is a need for an improved approach to implement erasure coding for storage systems that can address multiple failures.

SUMMARY

Embodiments of the present invention provide an improved approach to implement erasure coding, which can address multiple storage unit failures in an efficient manner.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIGS. 6A-D illustrate a process for generating the horizontal/row parity data for these blocks within the storage units.

FIGS. 7A-F illustrate a process for generating a first set of diagonal parity data.

FIGS. 8A-F illustrate a process for generating a second set of diagonal parity data.

FIGS. 11A-E illustrate an example of a process for recovering data from failed storage units.

FIGS. 19A-H illustrate erasure coding according to an embodiment of the invention.

DETAILED DESCRIPTION OF THE EMBODIMENTS OF THE INVENTION

Embodiments of the present invention provide an improved approach to implement erasure coding, which can address multiple storage unit failures in an efficient manner. The embodiments of the invention can effectively address multiple failures of storage units that use the erasure coding.

Some embodiments of the invention operate by implementing multiple sets of parity data, where the number of parities corresponds to the amount of failure to be tolerated by the storage system. For example, if there is a set of four storage units to be protected from failure, and the storage system is expected to be able to tolerate a failure of three of the storage units, then there will be three sets of parity data that are created to protect against the possible failures.

The erasure coding approach of the present invention can generally protect against any number of storage unit failures. For example, in one embodiment, the inventive approach protects from up to three failures, while requiring less computation than is required by the Reed-Solomon algorithm. The embodiments of the invention uses independently computed parity blocks, as opposed to using some parity blocks as input values in computations of other parity blocks, and does not have the restriction that N+1 must be a prime number as is required by some conventional techniques.

The inventive approach computes K parity blocks where 1<=K<=3 to protect any number N>2 blocks against at most K failures. In one embodiment, all three parities compute the exclusive OR of elements of information blocks. In some embodiments, storage units correspond to software abstractions (such as files), and the "block" used in the erasure coding approach correspond to an extent group (group of contiguous extents). An "information block" pertains to a regular block containing user data. A parity block corresponds to an additional block containing parity data. An "erasure strip" corresponds to an ordered set of information and parity blocks encoded together.

Figure 19A:
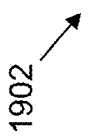

As shown in FIG. 19A, the approach first lines up N input blocks to make N columns in a matrix 1902. This figure shows a matrix with M rows and N=6 columns. This illustrative example uses Boolean values, but any actual implementations are free to use any word size and essentially process multiple Boolean matrixes in parallel.

Figure 19B:
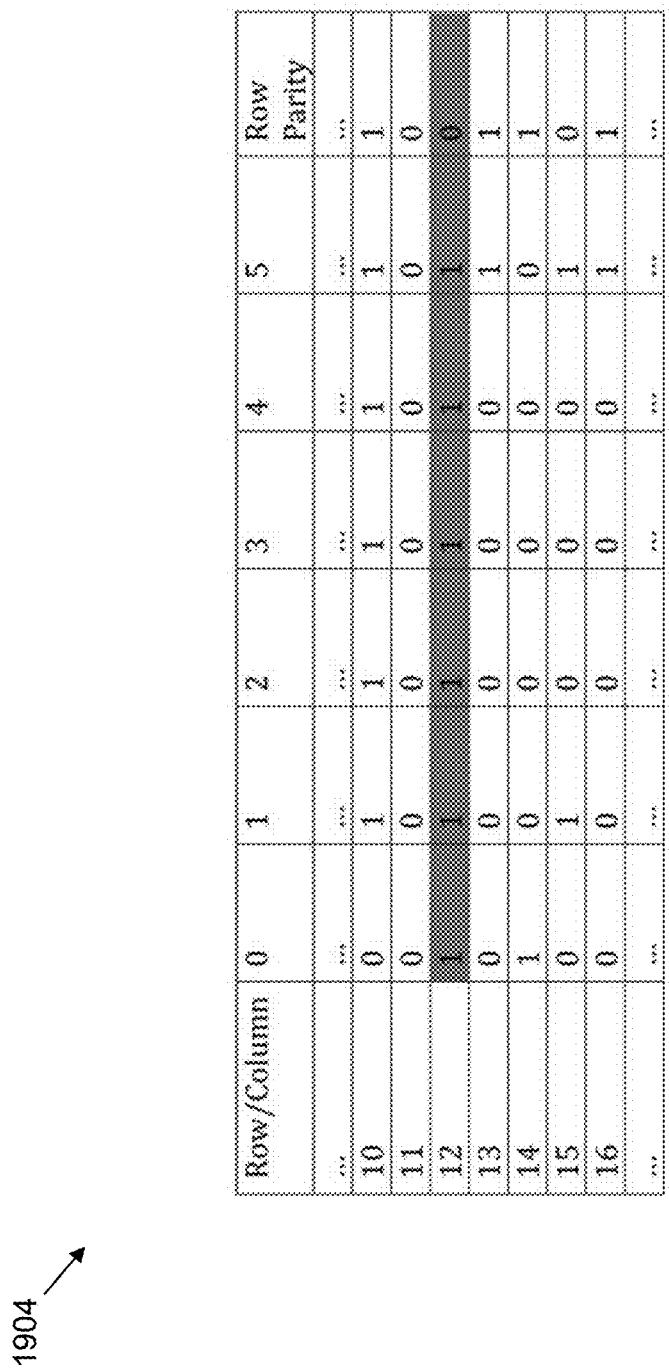
Figure 19C:
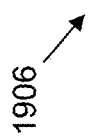

The parity blocks can be thought of as independent additional columns outside the matrix. As shown in FIG. 19B, the matrix 1904 includes a first parity column that computes the exclusive OR of row elements. As shown in FIG. 19C, the matrix 1906 includes a second parity column that computes the exclusive OR of descending diagonal elements. As shown in the matrix 1908 of FIG. 19D, the third parity column computes the exclusive OR of the ascending diagonal parity. If K=2 then the third parity column is not computed. If K=1 then only one parity column is computed.

Consider if the three matrix columns are lost and the system manages to decode a number of the bottom rows up to the 12th row as shown in the matrix 1910 of FIG. 19E. This figure does not show parity columns, but they are all available.

As shown in matrix 1912 of FIG. 19F, the ascending diagonal parity column is used to decode one value in the rightmost lost column. In this example, the value in the 5th column of the 11th row can therefore be decoded.

Similarly, one value in the leftmost lost column can be decoded using the descending diagonal parity column. In the example matrix 1914 of FIG. 19G, the value in the 1st column of the 11th row is decodable.

Figure 19H:
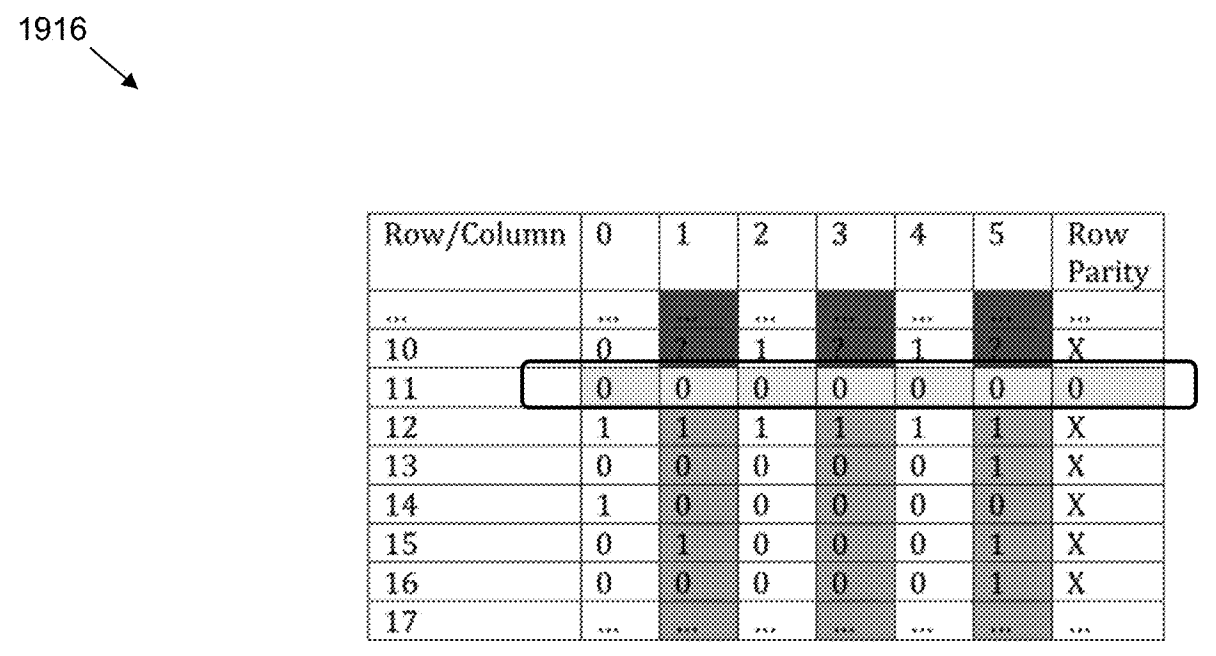

Finally, the row parity column can be used to decode at least one value in the middle lost column because the two other lost values in the row have just been decoded using diagonal parity columns. In our example, the 11th row has all values either available or decoded except the value in the 3rd column. FIG. 19H shows a matrix 1916 where the third row is decoded using the row parity column.

The system can then decode the rest of the matrix values three values at a time. However, in some circumstances, it may be difficult to decode a sufficient number of rows in the matrix to bootstrap decoding. In order to facilitate bootstrapping, the matrix is extended by as many imaginary zero rows as necessary. In some embodiments, N−1 zero rows are added as imaginary rows. The imaginary zero extension provides the values that do not exist in the matrix for computation of diagonal parity columns. Therefore, the size of the diagonal parity columns may be larger than the size of a regular column by N−1 values.

If only two columns are lost, the first of the three decoding steps described above is not performed. If only one matrix column is lost then only the last step is necessary. If parity columns are lost, they are decoded after information columns are decoded by repeating the encoding procedure which computes the lost parity columns.

Figure 1:
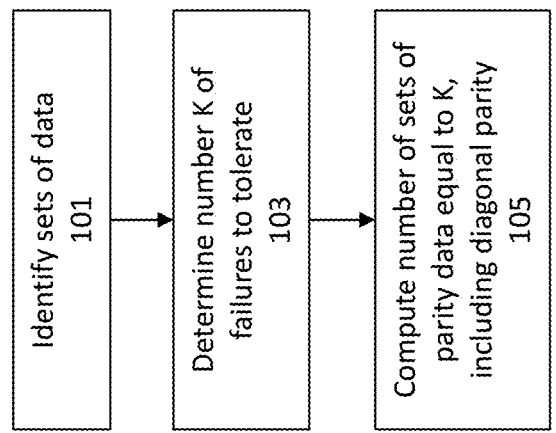
FIG. 1 illustrates a flowchart of an approach to implement erasure coding according to some embodiments of the invention.

FIG. 1 shows a high level flowchart of an approach to implement erasure coding according to some embodiments of the invention. At 101, identification is made of the set of data to be processed for the erasure coding. The erasure coding implemented using the invention may be applied to any type of storage, whether at the hardware level or at a logical level. For example, the erasure coding described herein may be applied on a storage device basis, e.g., at disk boundaries. In this scenario, the data identified for processing pertains to a set of storage devices, e.g., hard disk drives (HDDs) or solid-state drives (SSDs). The invention may also be applied relative to logical storage abstractions, such as at the file system or application level. In this case, a set of files or other software objects may be identified for processing with the erasure coding.

At 103, a determination is made of the K number of failures to be tolerated in the storage system. For example, if there is a set of four storage units to be protected from failure, a determination may be made for the storage system to tolerate a failure of three (K=3) number of storage units.

At 105, parity data is created, where the number of sets of the parity data is equivalent to K. The different sets of parities will include line patterns having different slopes from one another.

As described in more detail below, some embodiments are implemented where the parity data may include one or more sets of diagonal parity data, and each set of parity encompasses the sets of data within the matrix of data. The diagonal parity may encompass any type of diagonal configuration. For example, if there is a need to implement two diagonal parities, then the first diagonal parity may have a different slope angle from the second diagonal parity. As another example, the first diagonal parity data may possess a negative slope while the second diagonal parity has a positive slope, e.g., where the two diagonal parities have negative reciprocal slopes. As yet another example, the diagonal parities may form a zig-zag pattern that changes slope (either from negative to positive or in terms of slope angle) as it traverses across the stripes.

Figure 2A:
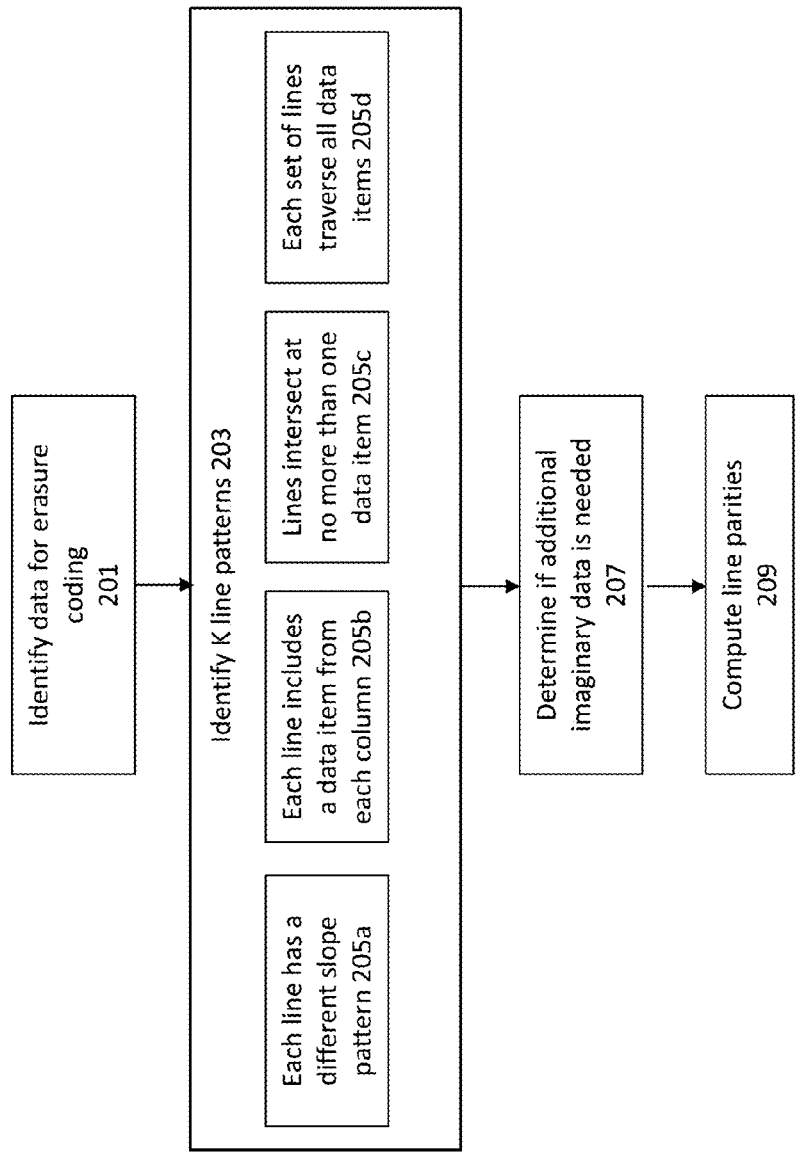
FIG. 2A illustrates a flowchart of an embodiment of the invention.

FIG. 2A shows a flowchart of an approach to implement some embodiments of the invention. At 201, identification is made of the set of data to be protected using the erasure coding. As noted above, the identified set of data may pertain to protection of hardware units or software units. The present description of the below embodiments is described and illustrated by referring to storage units as "blocks". This term is used to refer to any type of storage, whether at a hardware level or at a logical storage unit level, and is therefore not to be limited to a specific storage architecture unless specifically claimed as such.

At 203, a number of different line patterns are identified, where the numbers of line patterns corresponds to the number of failures to tolerate. For example, if there is a desire to protect against three storage unit failures, then there will be three line patterns that are created. Each different line pattern corresponds to a different set of parity data that will be created for the data.

As noted in 205*a*, each line will have a different slope pattern from another line pattern. The line may include any number of slopes, ranging from a slope of zero (for a row parity line that stretches horizontally across a matrix of data items in a row), to a line having a single slope (e.g., a diagonal line pattern having a single slope), to a line having multiple slopes (e.g., a zig-zag line pattern). Pursuant to 205*b*, each line includes a data item from each column of the matrix. As stated in 205*c*, the different line patterns should intersect at no greater than one data item within the matrix. As noted in 205*d*, the entire set of lines for a given line pattern should traverse all of the items in the matrix.

At 207, a determination is made whether any preset ("imaginary") data items are needed for the set of data. The reason for determining this preset data is to support the creation of parity data for lines that need to extend beyond the set of real data that exists in the matrix to satisfy the requirements of 205*a-d*. This type of data is explained in more detail below.

At 209, line parities are then computed for every line. The number of sets of line parities corresponds to the number of line patterns. If there are three different line patterns, then there will be three sets of parities that are computed.

Figure 2B:
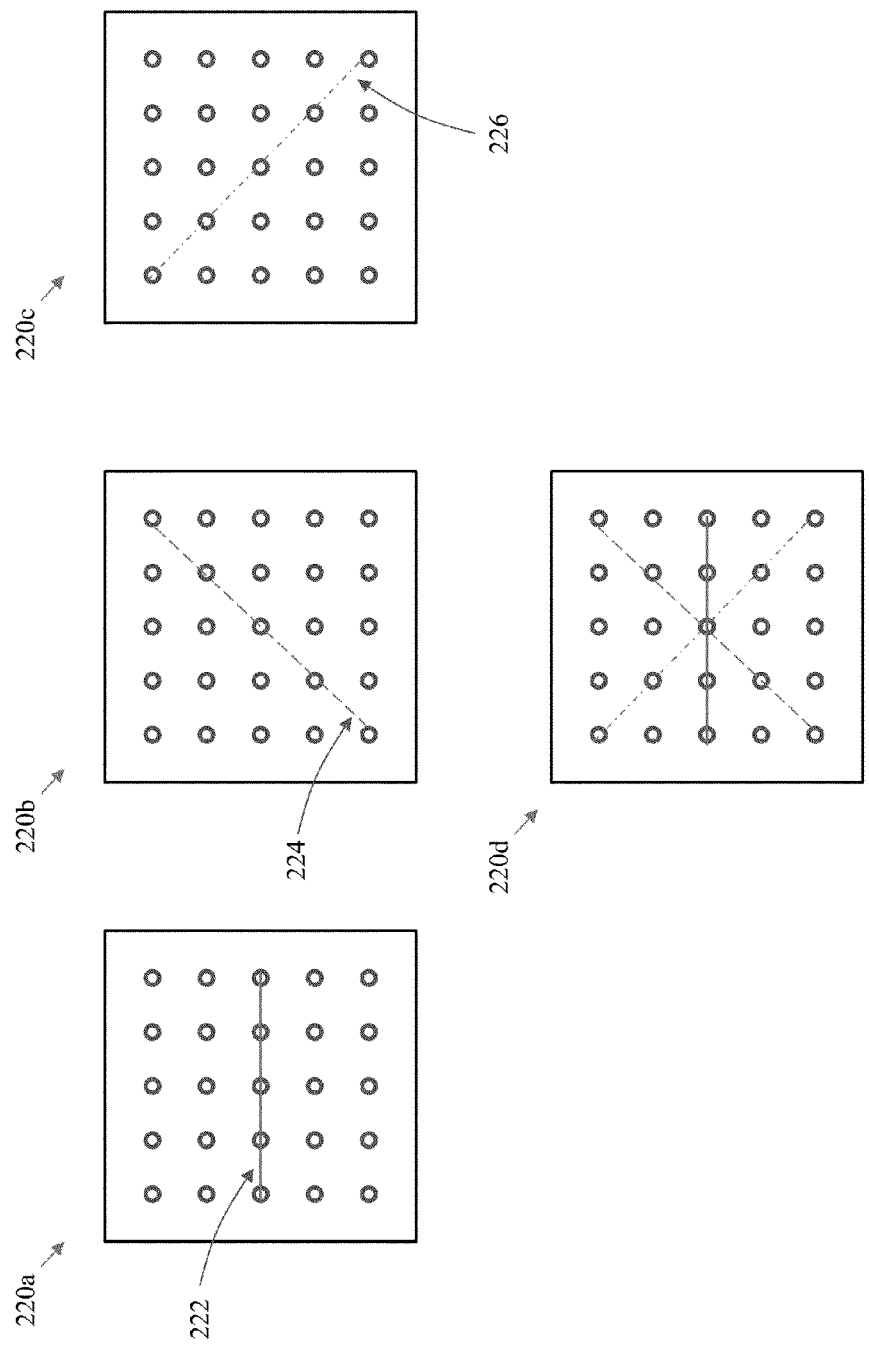
FIGS. 2B and 2C illustrate example line patterns.

FIG. 2B shows an example set of line patterns. In the matrix of 220*a*, a first line pattern 222 is shown that corresponds to a line of zero slope. Therefore, the parity data computed for this line pattern will be a row parity that corresponds to the data items within a row of the matrix 220*a*. In the matrix 220*b*, a first diagonal line pattern 224 is shown that corresponds to a slope of 45 degrees. In the matrix 220*c*, a second diagonal line pattern 226 is shown that corresponds to a slope of −45 degrees. The parity data for these diagonal line patterns correspond to each data item along the diagonal line(s). Lines may wrap from one edge of the matrix to another edge, as needed, for these diagonal lines. 220*d* illustrates the interplay of these different line patterns on the same matrix.

Figure 2C:
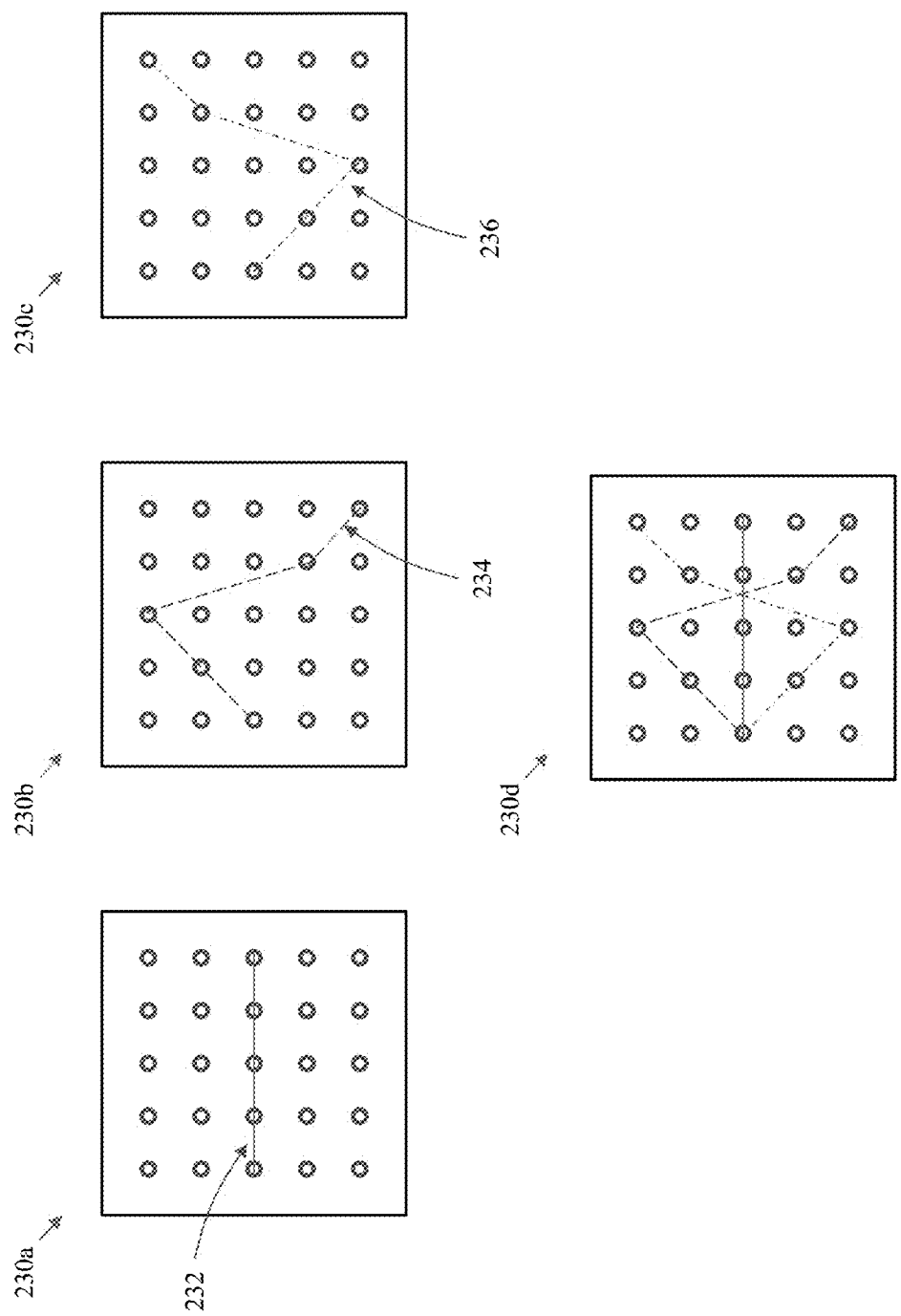

FIG. 2C shows another example set of line patterns. Here, some of the line patterns may include different slopes within the same line. In the matrix of 230*a*, a first line pattern 232 is shown that corresponds to a line of zero slope. Therefore, the parity data computed for this line pattern will be a row parity that corresponds to the data items within a row of the matrix 230*a*.

In the matrix 230*b*, a second line pattern 234 is shown that corresponds to a multi-sloped pattern having both a positive slope and multiple negative slopes. In the matrix 230*c*, a third line pattern 236 is shown that corresponds to a multi-sloped pattern having multiple positive slopes and a negative slope. 230*d* illustrates the interplay of these different line patterns on the same matrix.

Figure 2D:
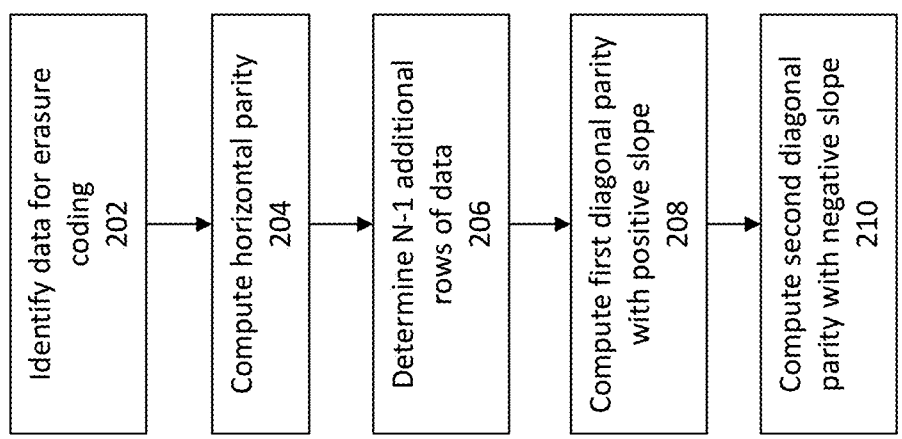
FIG. 2D shows a particular example of an embodiment of the invention applied to a storage system that tolerates a total of three failures.

FIG. 2D shows a flowchart of an approach to implement the embodiment of FIG. 2B as applied to a storage system that tolerates a total of three failures. In this case, there will be three sets of parity data to be created. For example, if there is a set of N storage units (e.g., N=4) to be protected from failure, and the storage system is expected to be able to tolerate a failure of K number of the storage units (e.g, K=3), then there will be three sets of parity data that are created to protect against the possible failures from among the four storage units.

At 202, identification is made of the set of data to be protected using the erasure coding. As noted above, the identified set of data may pertain to protection of hardware units or software units. The present description of the below embodiments is described and illustrated by referring to storage units as "blocks". This term is used to refer to any type of storage, whether at a hardware level or at a logical storage unit level, and is therefore not to be limited to a specific storage architecture unless specifically claimed as such.

As noted above, there will be three sets of parity data created in this embodiment. For example, in a system that creates three sets of parity data, there will be one set of horizontal parity, one set of parity having a positively sloped diagonal parity, and one set of parity having a negatively sloped diagonal parity.

At 204, a set of horizontal parity is created. Here, each block within a storage unit at the same row level is used to generate the corresponding horizontal parity data for that row. For example, an XOR operation can be performed to obtain the parity for a given row of data.

At 206, additional rows of "imaginary" data are determined for the set of data. The reason for determining this data is to support the creation of diagonal parity data. As illustrated in more detail below, the imaginary rows of data are provided as known set of data in the event of a failure of one or more of the storage units. These imaginary rows of data also contribute to the diagonal parity data.

It is noted that these additional rows are not actually included into the set of data as actual data objects that consume any additional (or significant) resources of storage space. Instead, since the additional rows are "imaginary" and only include known data values (e.g., value of "0"), they can be determined without being materialized in any way. In the illustrative embodiments described below, the number of rows of imaginary data to be added is equivalent to N−1. However, the number of rows of imaginary data can be a different from N−1, especially if there are different variations in slopes than is described in the below embodiments, For example, when multiple slopes beyond just +/−1 is employed, then one approach is to set the number of imaginary rows at some multiple of the absolute value of the slope.

At 208, a first set of parity data having a positively/ascending sloped diagonal parity is created. At 210, a second set of parity data having a negatively/descending sloped diagonal parity is created. These diagonal parities in the present embodiment are mirror images of each other.

Figure 3A:
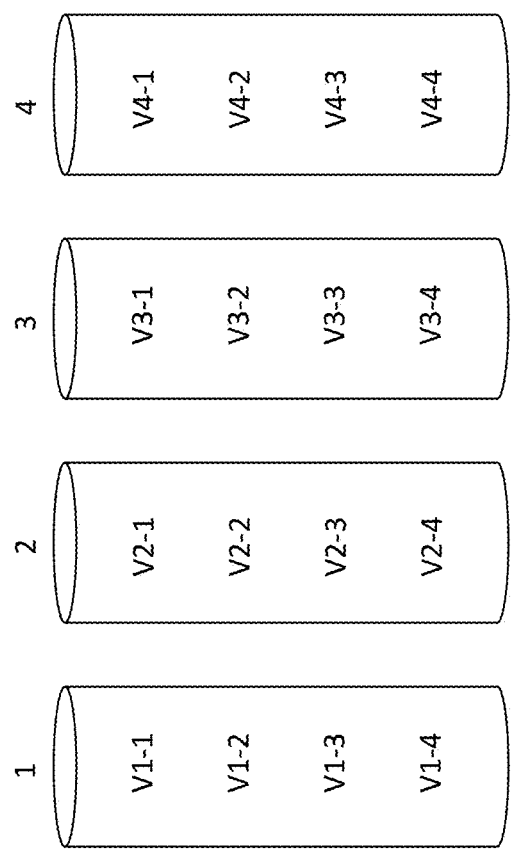
FIGS. 3A and 3B illustrate example storage units.
Figure 3B:
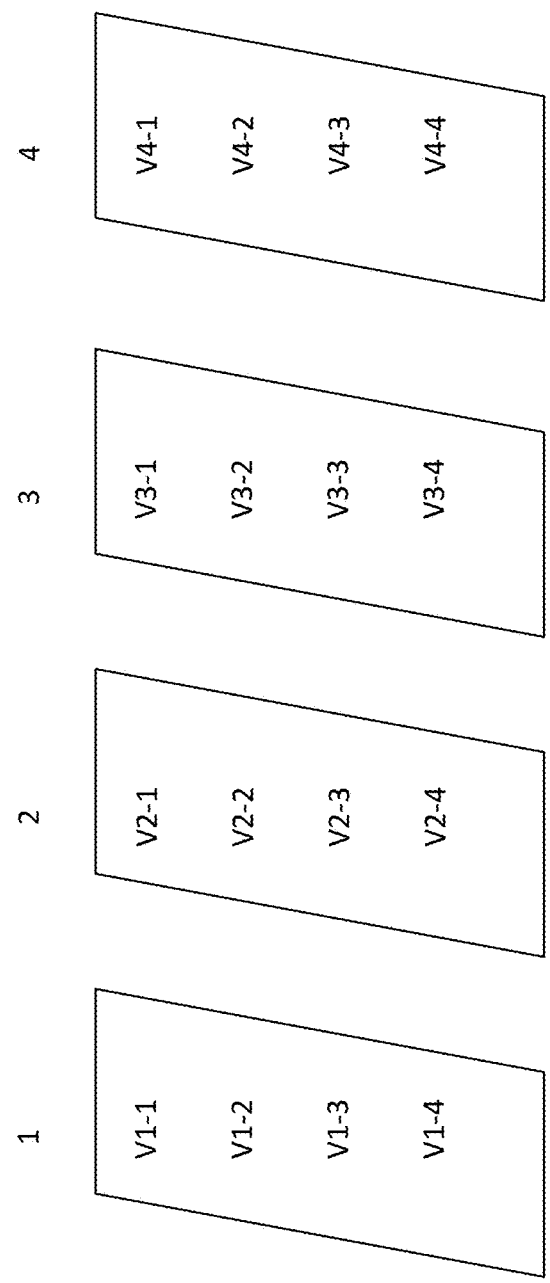

To illustrate this process, consider the storage units 1, 2, 3, and 4 shown in FIG. 3A. This figure shows the storage units as hardware storage units, where each of the hardware storage units includes multiple block of data to be protected from failure. Here, storage unit 1 includes blocks V1-1, V1-2, V1-3, and V1-4. Similarly, storage unit 2 includes blocks V2-1, V2-2, V2-3, and V2-4, storage unit 3 includes blocks V3-1, V3-2, V3-3, and V3-4, and storage unit 4 includes blocks V4-1, V4-2, V4-3, and V4-4. FIG. 3B shows an equivalent version of this set of data where the storage units are logical abstractions, e.g., where storage units 1, 2, 3, and 4 are files.

Figure 4:
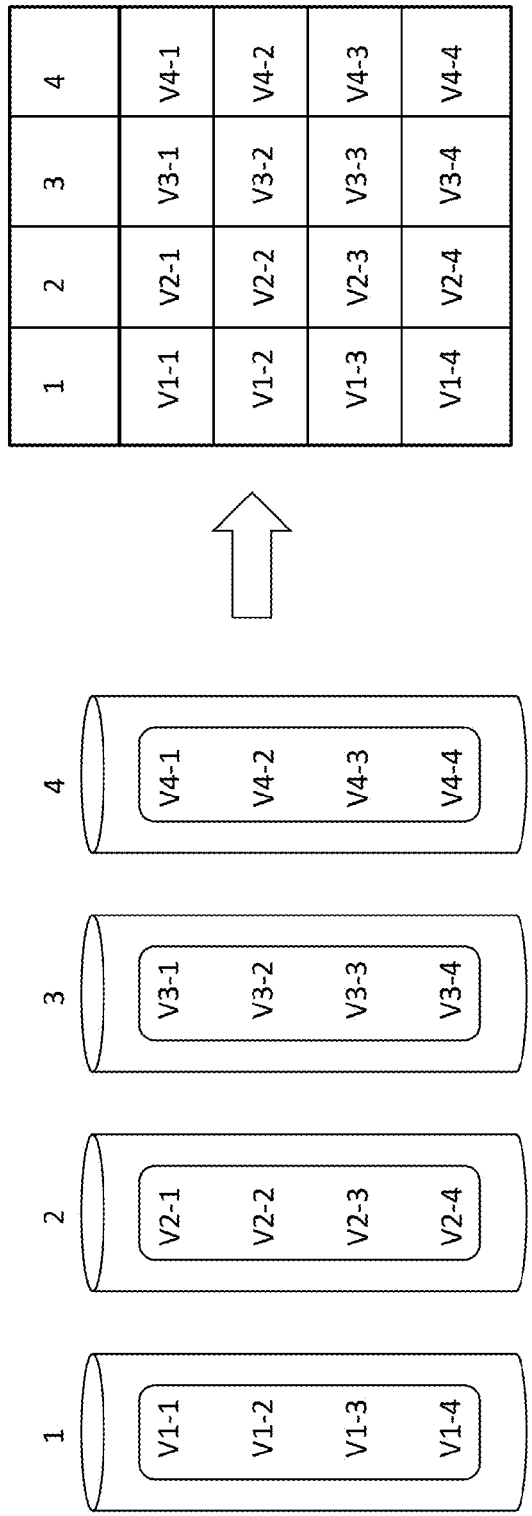
FIG. 4 illustrates blocks within storage units organized into rows and columns of a matrix.

As shown in FIG. 4, the blocks within the storage units 1, 2, 3, and 4 can be organized into rows and columns of a matrix, where each column corresponds to a separate storage unit. Each row corresponds to a set of blocks from each storage unit.

Figure 5:
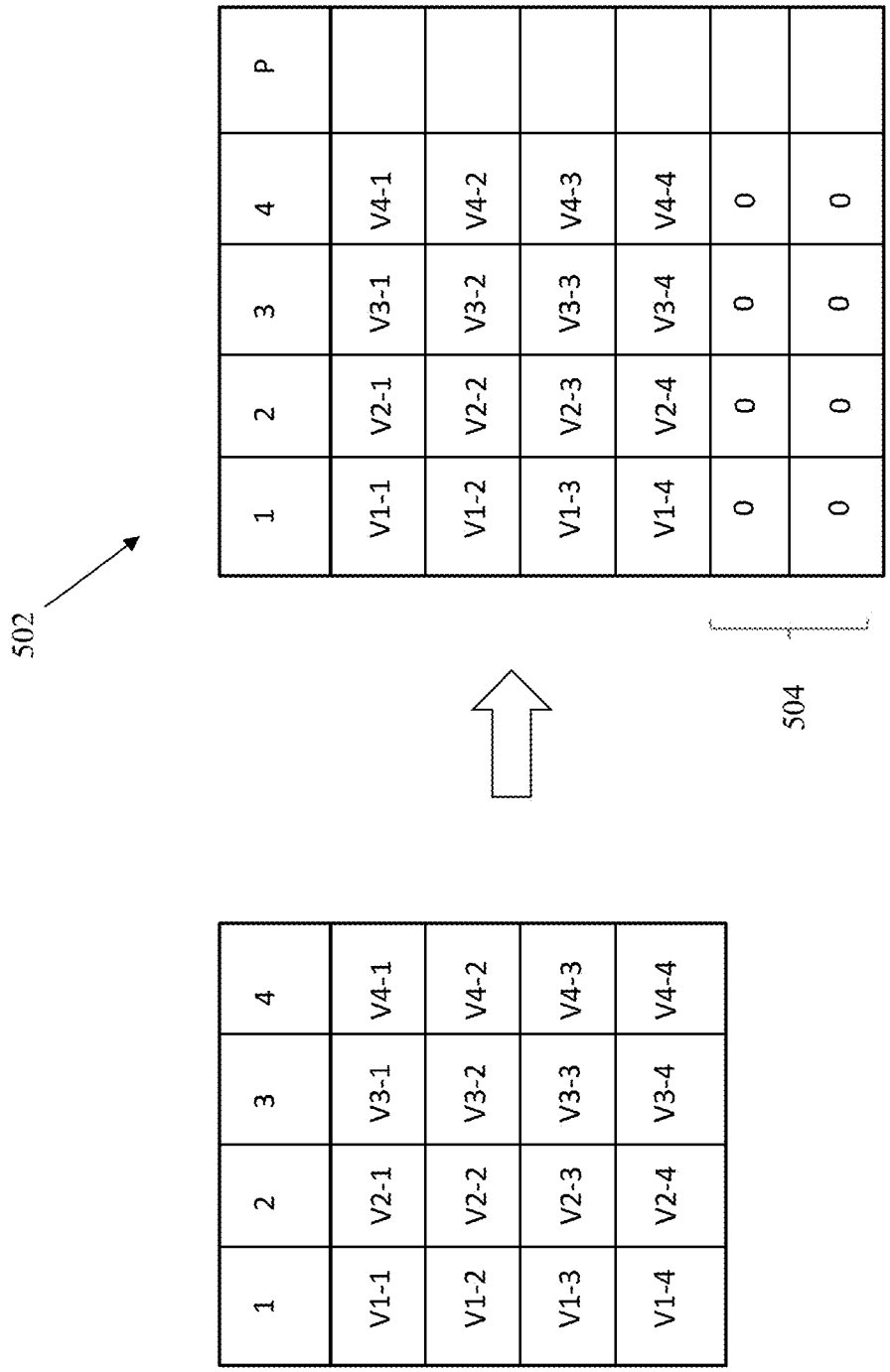
FIG. 5 shows a revised matrix of data that includes the additional rows of zeros that have been added to the data.

This example pertains to a scenario where there is a desire to protect against K=3 number of failures. To support the creation of parity data in this situation, additional rows of imaginary data are added to the set of data, where the number of rows of imaginary data to be added is equivalent to K−1. In this case, since K=3, two rows of imaginary data is added. Any known value may be placed into the additional rows of data. In some embodiments, the value "0" is placed into the additional rows of data. FIG. 5 shows a revised matrix 502 of the data that includes the additional two rows 504 of zeros that have been added to the data. This shows that the same number of preset values is added to each "strip" or column in the matrix.

FIGS. 6A-D illustrate a process for generating the horizontal/row parity data for these blocks within the storage units. FIG. 6A shows computation of a parity $P1_{Hor}$ that corresponds to the first row 601 of blocks (V1-1, V2-1, V3-1, and V4-1). For example, parity $P1_{Hor}$ can be computed by calculating the XOR of the blocks within the first row 601.

FIG. 6B shows computation of a parity $P2_{Hor}$ that corresponds to the second row 602 of blocks (V1-2, V2-2, V3-2, and V4-2). Parity $P1_{Hor}$ can be computed by calculating the XOR of the blocks within the second row 602. Similarly, FIG. 6C shows computation of a parity $P3_{Hor}$ that corresponds to the third row 603 of blocks (V1-3, V2-3, V3-3, and V4-3), where $P1_{Hor}$ is computed by calculating the XOR of the blocks within the third row 603. FIG. 6D shows computation of a parity $P4_{Hor}$ that corresponds to the fourth row 604 of blocks (V1-4, V2-4, V3-4, and V4-4), where $P4_{Hor}$ is computed by calculating the XOR of the blocks within the fourth row 604.

It is noted that the fifth and sixth rows only include the imaginary data that was determined for the matrix (e.g., zero data). Therefore, there is no need to calculate a parity for these rows.

At this point, all of the horizontal/row parity data has been computed. The set of parity data includes $P1_{Hor}$, $P2_{Hor}$, $P3_{Hor}$, and $P4_{Hor}$, with one horizontal/row parity for each row within the set of data (except for the imaginary rows).

Next, a set of diagonal parity data will be created. FIGS. 7A-F illustrate a process for generating a first set of diagonal parity data for the blocks within the storage units 1, 2, 3, and 4.

FIG. 7A shows computation of a first diagonal parity $P1_{Diag1}$ that corresponds to a diagonal set 701 of blocks. Here, the diagonal set 701 of blocks includes the imaginary data (e.g., 0) from the first column, block V2-4 from the second column, block V3-3 from the third column, and block V4-2 from the fourth column. Parity $P1_{Diag1}$ can be computed by calculating the XOR of the blocks within set 701.

Figure 7B:
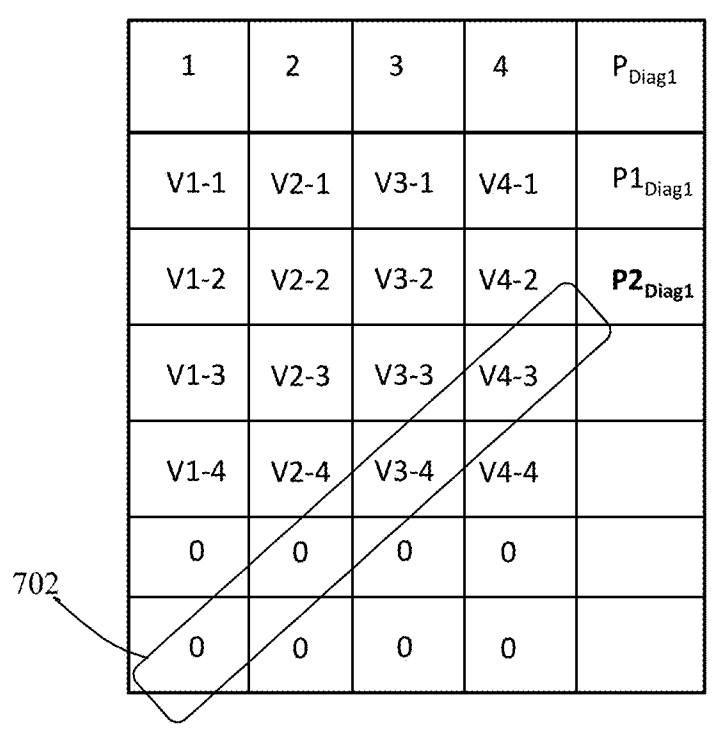

FIG. 7B shows computation of a second diagonal parity $P2_{Diag1}$ that corresponds to a diagonal set 702 of blocks. Here, the diagonal set 702 of blocks includes the imaginary data from the sixth row of the first column, the imaginary data from the fifth row of the second column, block V3-4 from the third column, and block V4-3 from the fourth column. Parity $P2_{Diag1}$ can be computed by calculating the XOR of the blocks within set 702.

Figure 7C:
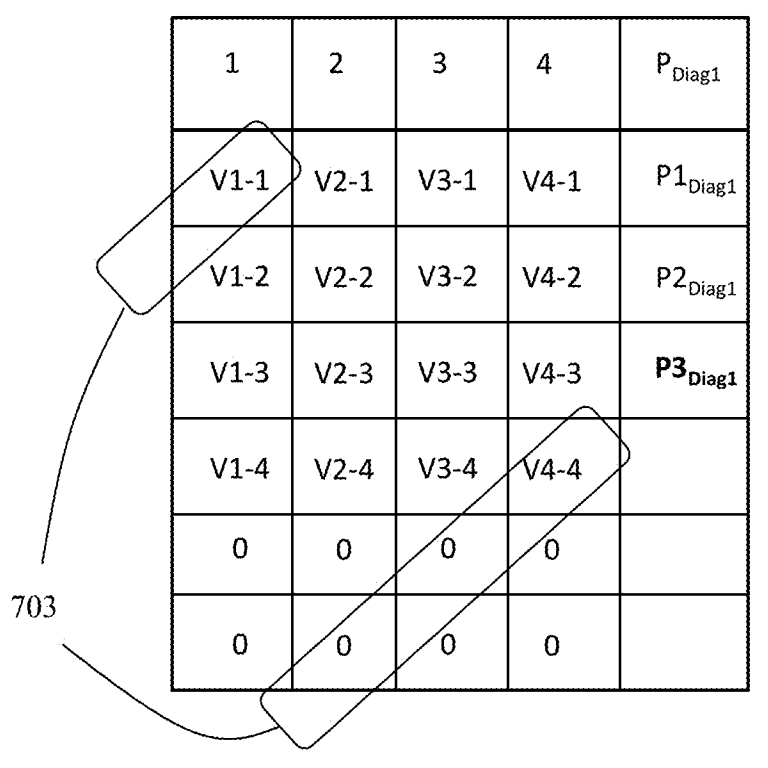

FIG. 7C shows computation of a third diagonal parity $P3_{Diag1}$ that corresponds to a diagonal set 703 of blocks. Here, the diagonal set 703 of blocks actually wraps from the bottom rows across to the top rows. Therefore, this set 703 includes block V1-1 from the first column, the imaginary data from the sixth row of the second column, the imaginary data from the fifth row of the third column, and block V4-4 from the fourth column. Parity $P3_{Diag1}$ can be computed by calculating the XOR of the blocks within set 703.

Figure 7D:
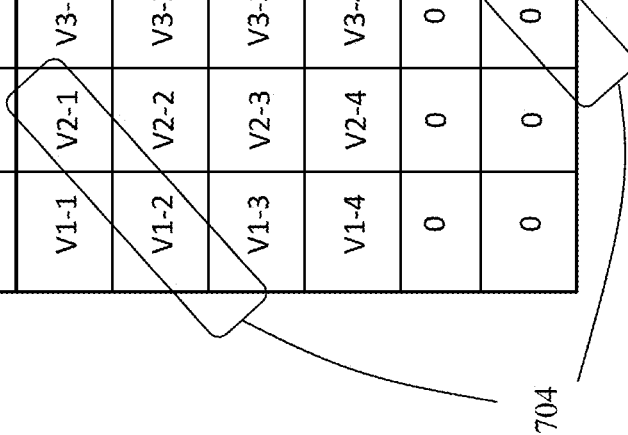

In a similar way, FIG. 7D shows computation of the fourth diagonal parity $P4_{Diag1}$ where the diagonal set 704 of blocks wraps from the bottom rows to the top rows. Here, the diagonal set 704 includes block V1-2 from the first column, block V2-1 from the second column, the imaginary data from the sixth row of the third column, and the imaginary data from the fifth row of the fourth column. Parity $P4_{Diag1}$ can be computed by calculating the XOR of the blocks within set 704.

Figure 7E:
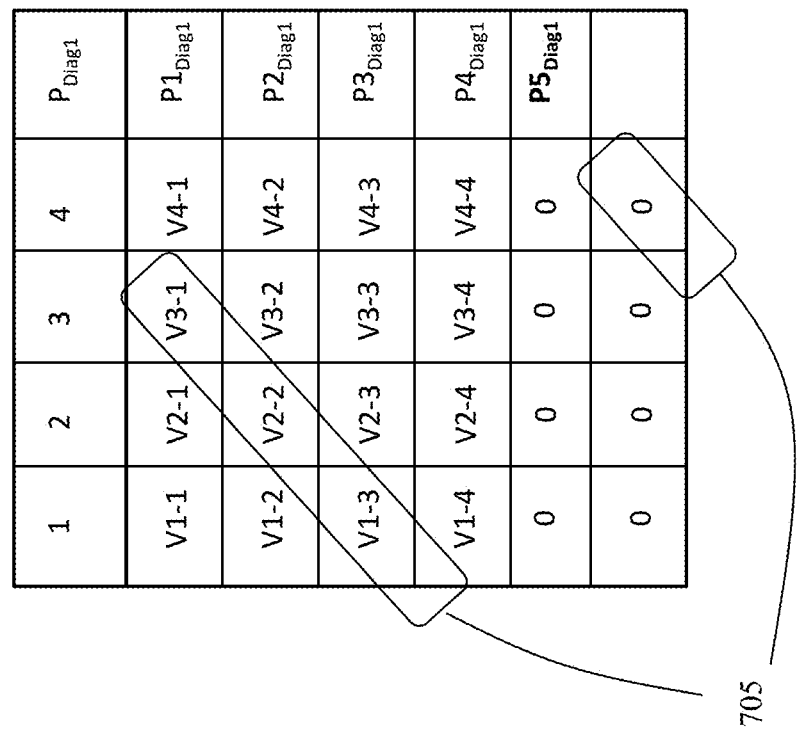

FIG. 7E shows computation of the fifth diagonal parity $P5_{Diag1}$ where the diagonal set 705 of blocks also wraps from the bottom rows to the top rows. The diagonal set 705 includes block V1-3 from the first column, block V2-2 from the second column, block V3-1 from the third column, and the imaginary data from the sixth row of the fourth column. Parity $P5_{Diag1}$ can be computed by calculating the XOR of the blocks within set 705.

FIG. 7F shows computation of the sixth diagonal parity $P6_{Diag1}$ where the diagonal set 706 includes block V1-4 from the first column, block V2-3 from the second column, block V3-2 from the third column, and block V4-1 from the fourth column. Parity $P6_{Diag1}$ can be computed by calculating the XOR of the blocks within set 706.

At this point, all of the diagonal parity data for the first diagonal set has been computed. The first set of diagonal parity data includes $P1_{Diag1}$, $P2_{Diag1}$, $P3_{Diag1}$, $P4_{Diag1}$, $P5_{Diag1}$, and $P6_{Diag1}$.

Next, a second set of diagonal parity data will be created. FIGS. 8A-F illustrate a process for generating the second set of diagonal parity data for the blocks within the storage units 1, 2, 3, and 4. Here, the second set of parity data in FIGS. 8A-F has a negative slope sloping downwards to the right (as opposed to the positive slope of the diagonal parities sloping upwards to the right for the diagonal parity set shown in FIGS. 7A-F).

FIG. 8A shows computation of a diagonal parity $P1_{Diag2}$ for the second set of parity data that corresponds to a diagonal set 801 of blocks. Here, the diagonal set 801 of blocks includes block V1-3 from the first column, block V2-4 from the second column, the imaginary data from the fifth row of the third column, and the imaginary data from the sixth row of the fourth column. Parity $P1_{Diag2}$ can be computed by calculating the XOR of the blocks within set 801.

Figure 8B:
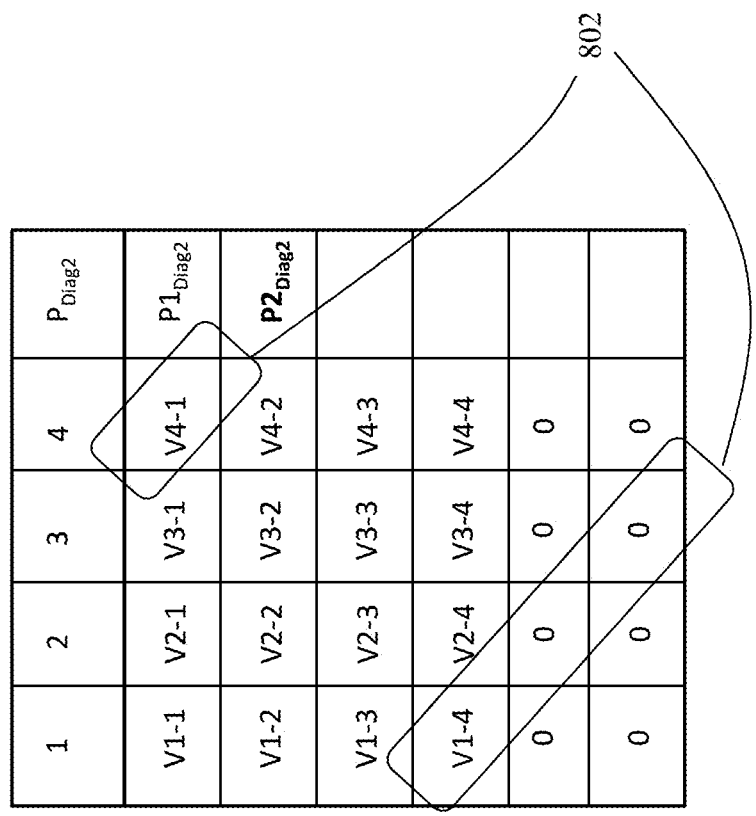

FIG. 8B shows computation of a diagonal parity $P2_{Diag2}$ that corresponds to a diagonal set 802 of blocks. Here, the diagonal set 802 of blocks wraps from the bottom rows across to the top rows. The diagonal set 802 of blocks includes block V1-4 from the first column, the imaginary data from the fifth row of the second column, the imaginary data from the sixth row of the third column, and block V4-1 from the fourth column. Parity $P2_{Diag2}$ can be computed by calculating the XOR of the blocks within set 802.

Figure 8C:
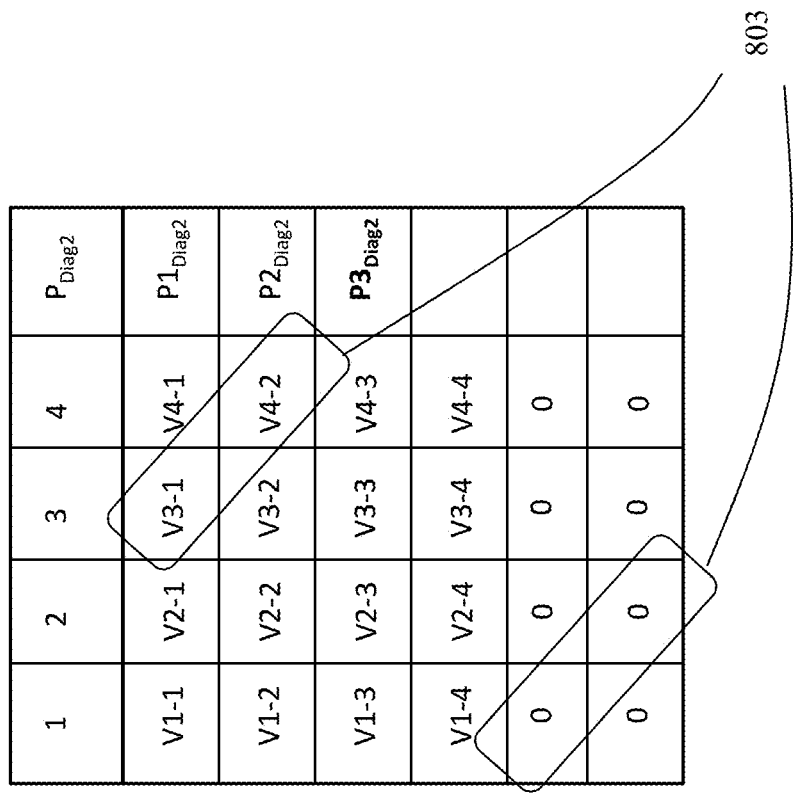

FIG. 8C shows computation of a diagonal parity $P3_{Diag2}$ that corresponds to a diagonal set 803 of blocks. Here, the diagonal set 803 of blocks wraps from the bottom rows across to the top rows, and includes the imaginary data from the fifth row of the first column, and the imaginary data from the sixth row of the second column, block V3-1 from the third column, and block V4-2 from the fourth column. Parity $P3_{Diag2}$ can be computed by calculating the XOR of the blocks within set 803.

Figure 8D:
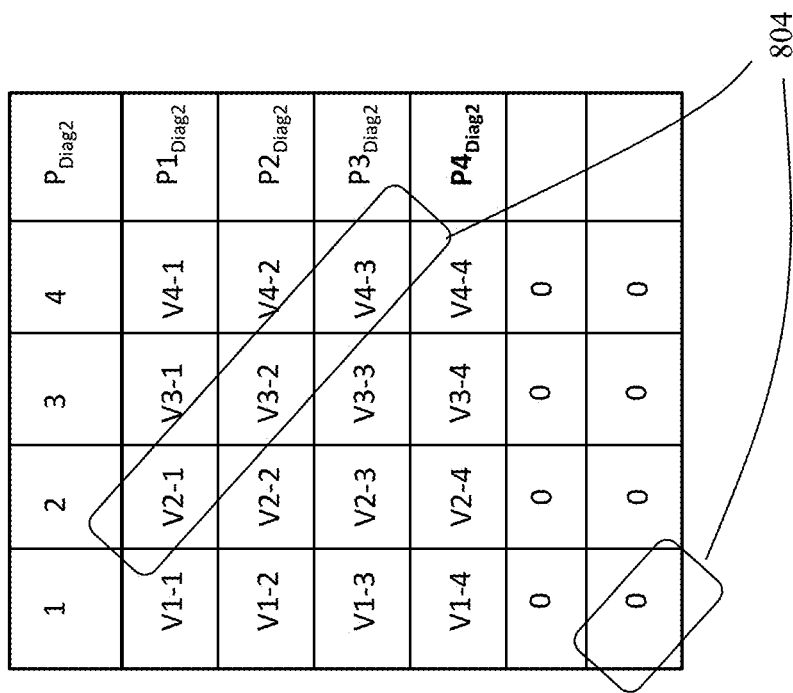

FIG. 8D shows computation of a diagonal parity $P4_{Diag2}$ that corresponds to a diagonal set 804 of blocks. Here, the diagonal set 804 of blocks wraps from the bottom rows across to the top rows, and includes the imaginary data from the sixth row of the first column, block V2-1 from the second column, block V3-2 from the third column, and block V4-3 from the fourth column. Parity $P4_{Diag2}$ can be computed by calculating the XOR of the blocks within set 804.

Figure 8E:
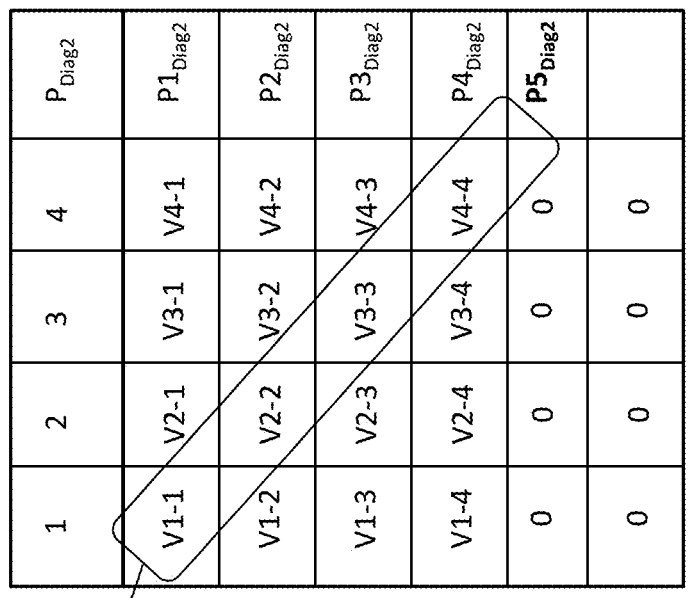

FIG. 8E shows computation of a diagonal parity $P5_{Diag2}$ that corresponds to a diagonal set 805 of blocks. Here, the diagonal set 805 of blocks includes block V1-1 from of the first column, block V2-2 from the second column, block V3-3 from the third column, and block V4-4 from the fourth column. Parity P5$_{Diag2}$ can be computed by calculating the XOR of the blocks within set 805.

Finally, FIG. 8F shows computation of a diagonal parity P6$_{Diag2}$ that corresponds to a diagonal set 806 of blocks. Here, the diagonal set 806 of blocks includes block V1-2 from of the first column, block V2-3 from the second column, block V3-4 from the third column, and the imaginary block from the fifth row of the fourth column. Parity P6$_{Diag2}$ can be computed by calculating the XOR of the blocks within set 806.

At this point, all of the diagonal parity data for the second diagonal set has been computed. The second set of diagonal parity data includes P1$_{Diag2}$, P2$_{Diag2}$, P3$_{Diag2}$, P4$_{Diag2}$, P5$_{Diag2}$, and P6$_{Diag2}$.

Figure 9A:
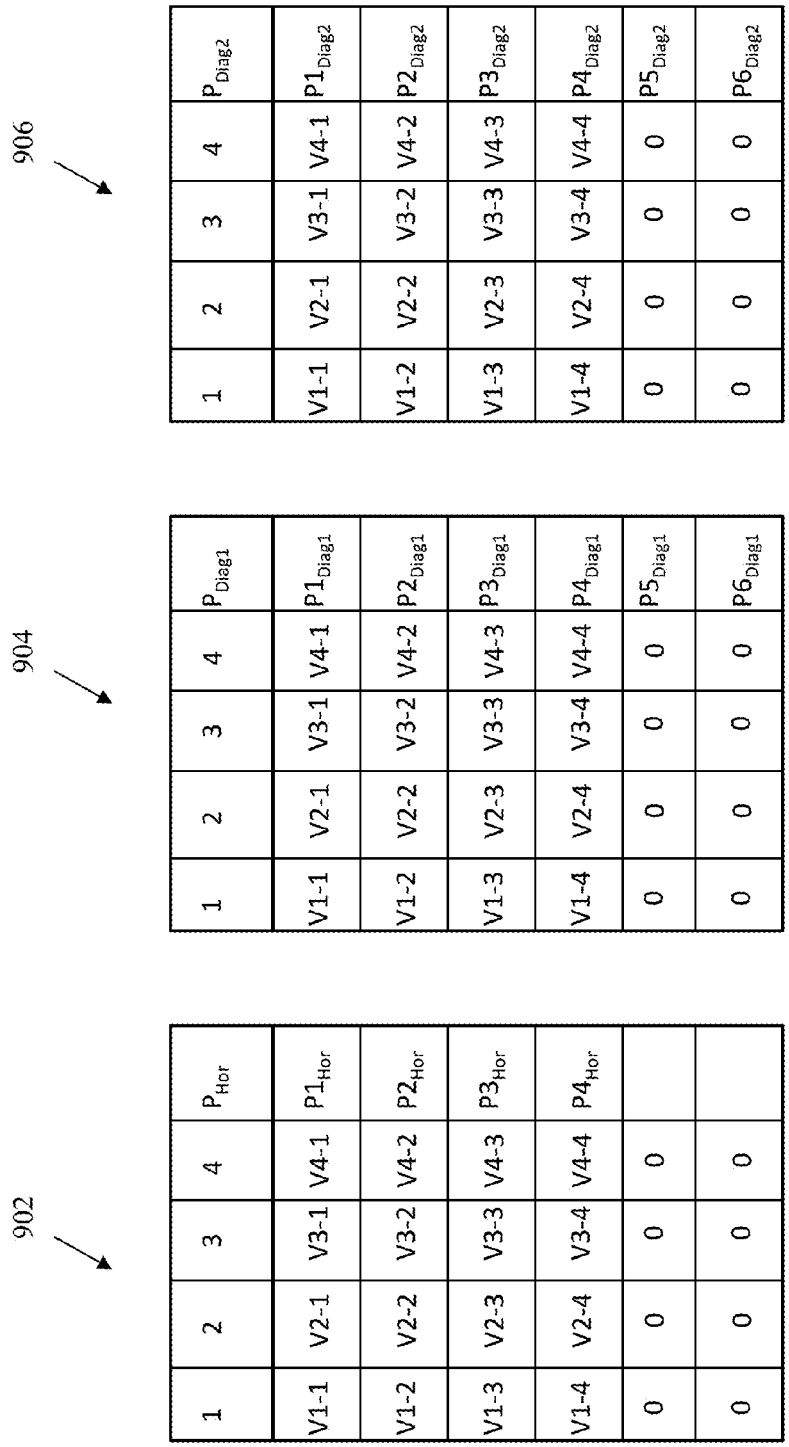
FIGS. 9A and 9B show sets of data as they correspond to the three sets of parity data.

FIG. 9A shows the different sets of data as they correspond to the three sets of parity data. 902 shows the matrix data as they correspond to the horizontal/row set of parity data, 904 shows the matrix data as they correspond to the first diagonal set of parity data, and 906 shows the matrix data as they correspond to the second diagonal set of parity data.

Figure 9B:

FIG. 9B shows another format for visualizing and/or storing the parity data, where each set of parity data corresponds to an additional column of data to be stored within the common matrix. Here, column 908 corresponds to the horizontal parity data, column 910 corresponds to the first set of diagonal parity data, and column 912 corresponds to the second set of diagonal parity data.

When data is changed in the system, the corresponding parities may also need to be updated as well. According to some embodiments of the invention, parities can be updated independently and in parallel without reading all blocks on the line of data. This can be accomplished by taking the old and new data values, along with the old and new parity value for each parity, to perform the re-computations. For example, assuming that the existing parity was calculated with an XOR of all data in a line (e.g., r=d1^d2^...^d10), and if d2 was updated, then the new parity can be computed by XOR of the old party, old value of d2, and new value of d2 (e.g., r_new=r_old^d2_new^d2_old). As is evident, this computation does not rely upon any other parities, and therefore any number of such calculations can be performed independently and in parallel to other such re-computations.

Figure 10:
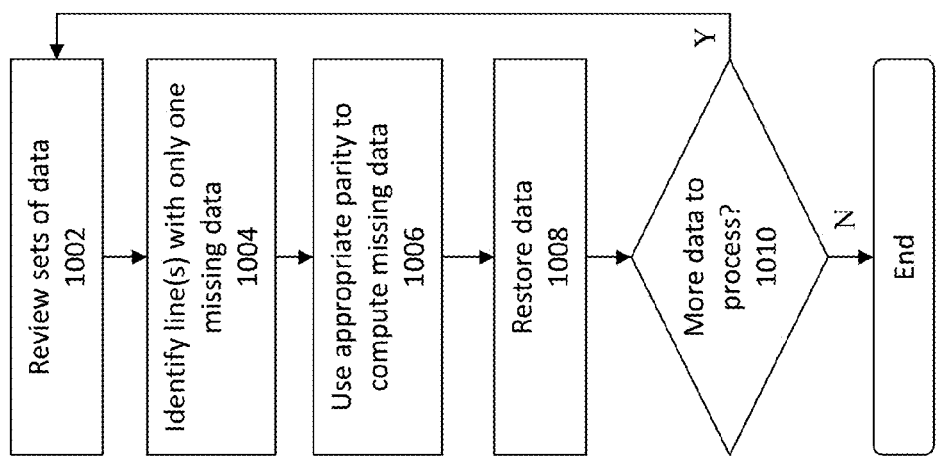
FIG. 10 shows a flowchart of an approach to recover from failure of multiple storage units.

FIG. 10 shows a flowchart of an approach to recover from failure of multiple storage units. At 1002, the set of data/storage units after the failure is reviewed. This action is taken to determine the extent of the data loss that needs to be addressed.

Next, at 1004, identification is made of a row/line of data (whether horizontal or diagonal) for which there is only a single block of data that has been lost. In this situation, since there is only a single missing block, the data can be easily recovered by performing an XOR operation using the remaining blocks in the row/line in combination with the parity data. Therefore, at 1006, the appropriate parity data is used to compute the missing data for the block. Any of the horizontal or diagonal data can be recovered in this step, so long as it is only missing a single block within a single row/line. At 1008, the computed data is restored, e.g., by placing the recovered data into a disk drive of file that has been placed online in place of the failed disk/file.

At 1010, a determination is made whether there are any further data to process. If so, then the process loops back through the previous steps to recover the lost data.

Figure 11A:

FIGS. 11A-E illustrate an example of this process for recovering data from failed storage units. FIG. 11A shows the matrix 1102 of data, where a problem has occurred such that storage units 1, 2, and 3 have undergone a failure. As a result, the blocks on these storage units are no longer available. This means that blocks V1-1, V1-2, V1-3, and V1-4 on storage unit 1 are no longer available to users. Similarly, blocks V2-1, V2-2, V2-3, and V2-4 on storage unit 1 and blocks V3-1, V3-2, V3-3, and V3-4 on storage unit 3 are no longer available to users. This situation is shown in FIG. 11B, where the "?" symbol is used to represent the missing data. It is noted that since storage unit 4 has not failed, the blocks V4-1, V4-2, V4-3, and V4-4 on storage unit 4 remain available.

Figure 11C:
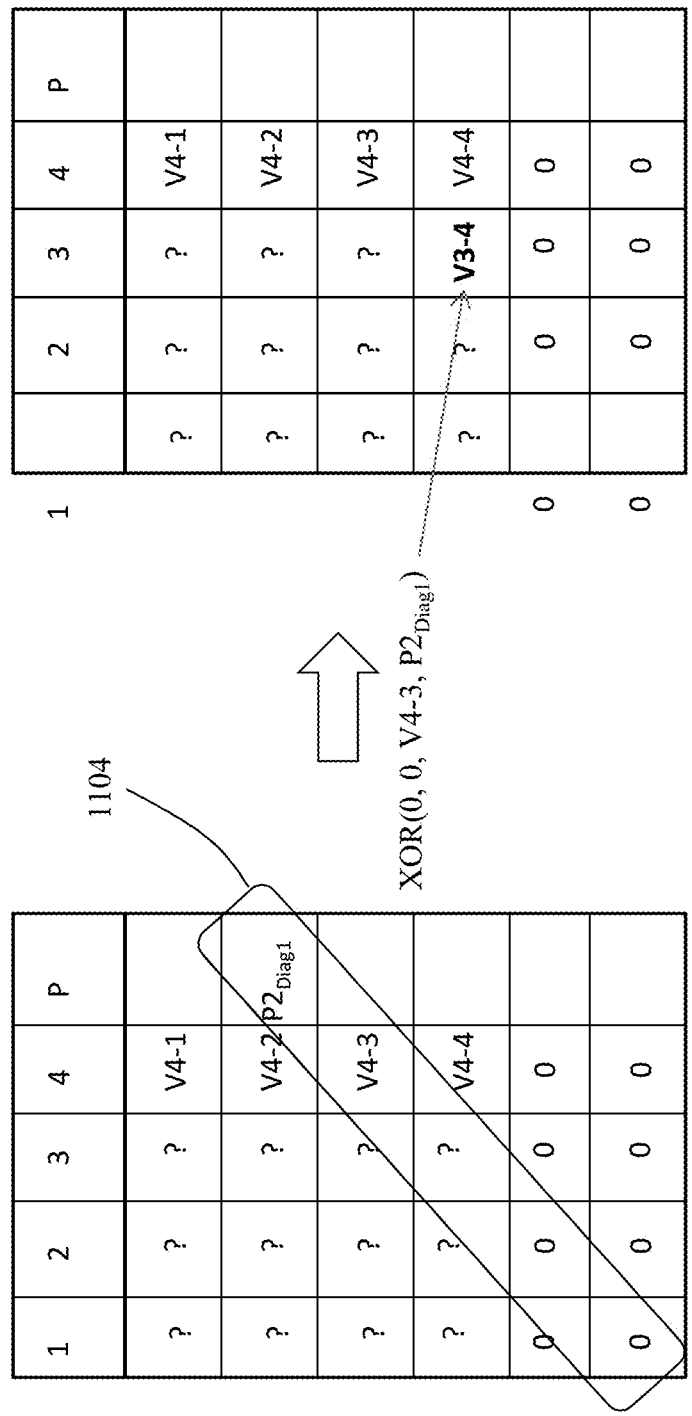

The first step is to identify any of the rows/lines where only a single block is missing. FIG. 11C shows that line 1104 is an example that is missing only a single block. In particular, this is a diagonal line that includes a known value in the first column, i.e., the imaginary value (0) in the sixth row of the first column A known value also exists in the second column, i.e., the imaginary value (0) in the fifth row of the second column. A known value exists in the fourth column, i.e., the block V4-3 in the fourth column. The only missing data due to the storage unit failures is in the fourth row of the third column.

Here, the missing data can be recovered by performing an XOR operation over the remaining data in combination with the diagonal parity data for this diagonal line. Here, the diagonal parity data for the line is P2$_{Diag1}$. Therefore, the missing data V3-4 can be recovered by performing an XOR operation using the parity data P2$_{Diag1}$ with the imaginary value (0) in the sixth row of the first column, the imaginary value (0) in the fifth row of the second column, and the block V4-3 in the fourth column.

This highlights one of the reasons for adding in the imaginary rows to the sets of data when constructing the parity data. Even though multiple storage units have failed, the additional rows of data provide enough known values such that lines can be identified which are only missing a single block value, allowing recovery of the missing data using the parity data.

Figure 11D:
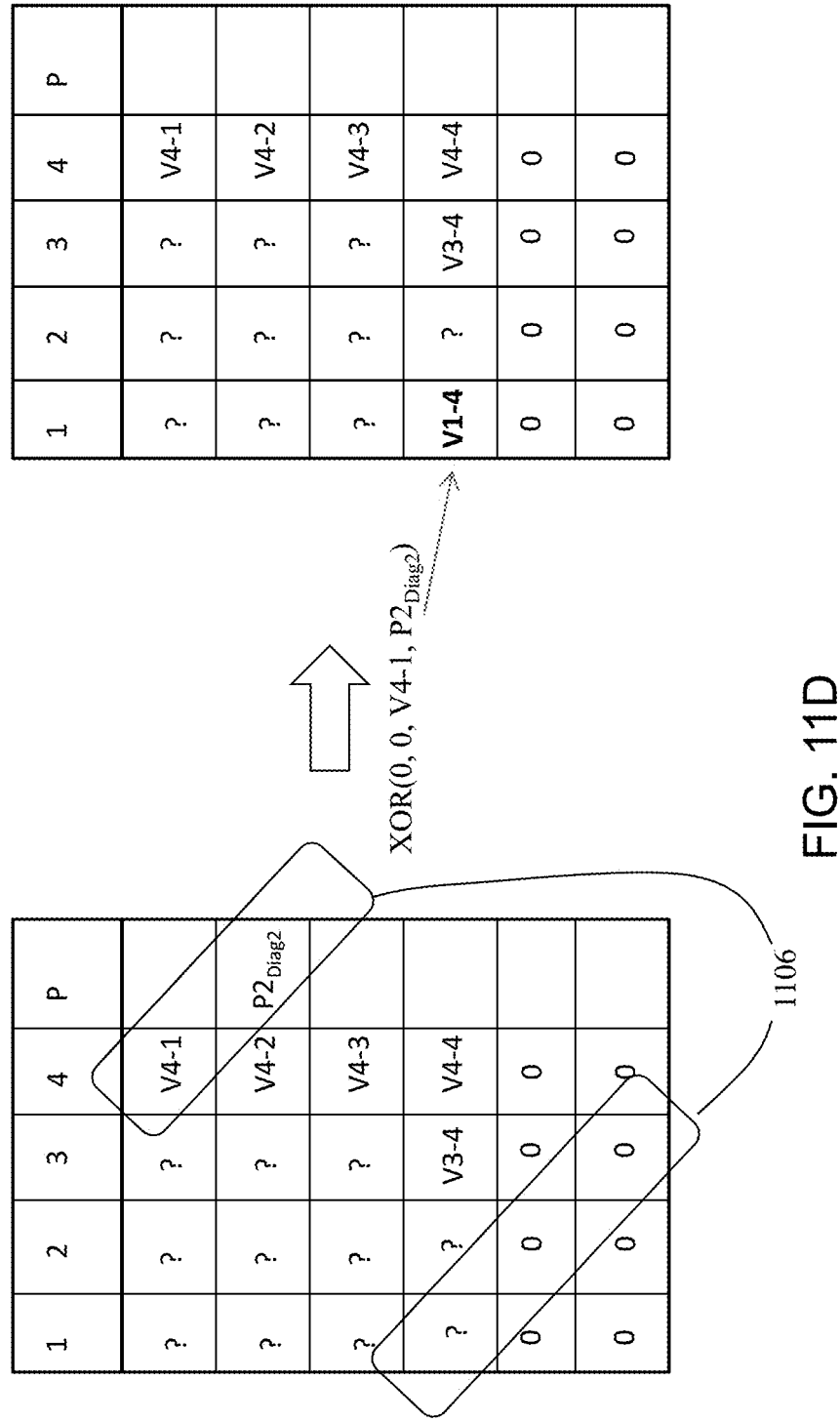

At this point, another line can be identified where the line includes only a single missing block. FIG. 11D shows that wrapped diagonal line 1106 is an example of a line that is missing only a single block. In particular, this is a wrapped diagonal line that includes a known value in the second column, i.e., the imaginary value (0) in the fifth row of the second column A known value exists in the third column, i.e., the imaginary value (0) in the sixth row of the third column A known value exists in the fourth column, i.e., the block V4-1 in the fourth column. The only missing data due to the storage unit failures is in the fourth row of the first column.

Here, the missing data can be recovered by performing an XOR operation over the remaining data in combination with the diagonal parity data for this diagonal line. Here, the diagonal parity data for the line is P2$_{Diag2}$. Therefore, the missing data (i.e., V1-4) can be recovered by performing an XOR operation using the parity data P2$_{Diag2}$ with the imaginary value (0) in the fifth row of the second column, the imaginary value (0) in the sixth row of the third column, and the block V4-1 in the fourth column.

Figure 11E:
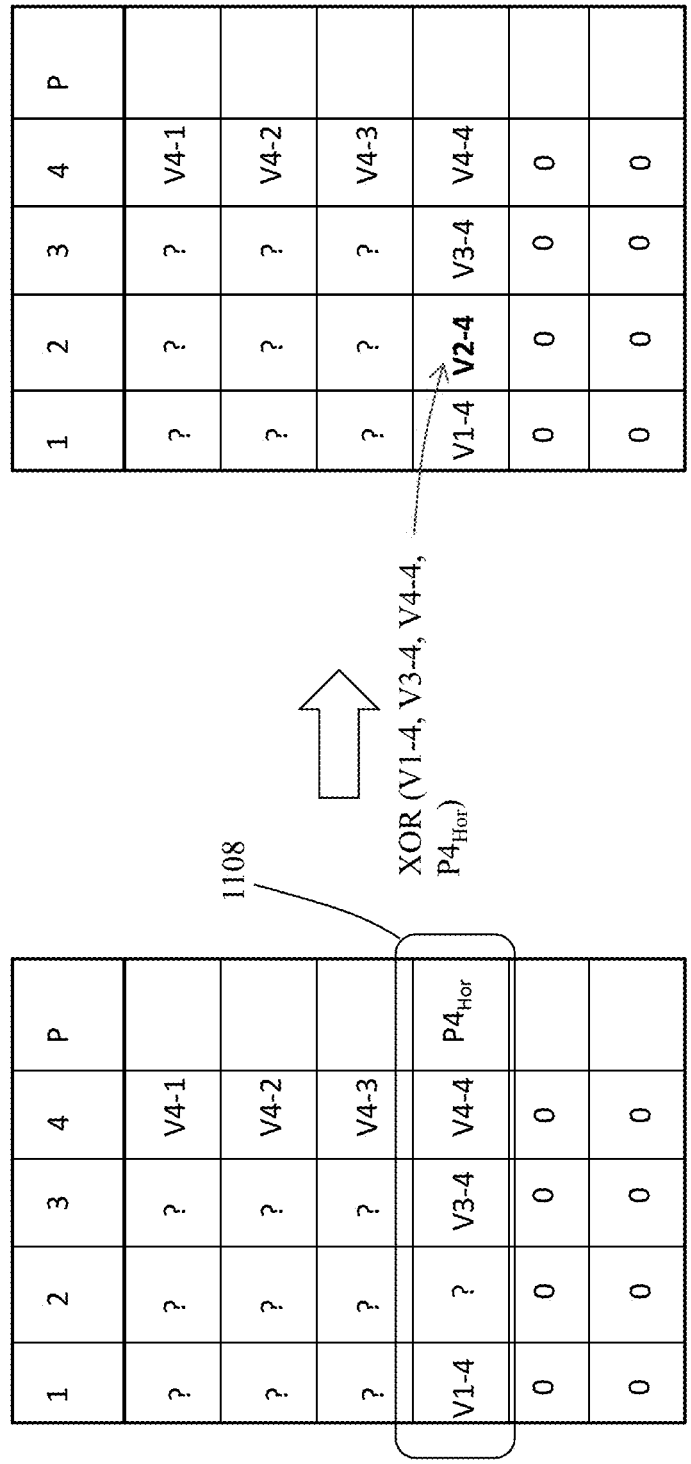

At this point, yet another line can be identified in the fourth row where the line includes only a single missing block. FIG. 11E shows that a horizontal line 1108 is missing only a single block. In particular, this line includes a known value in the first column, i.e., the block V1-4. A known value exists in the third column, i.e., the block V3-4. A known value also exists in the fourth column, i.e., the block V4-1 in the fourth column. The only missing data due to the storage unit failures is in the fourth row of the second column.

Here, the missing data can be recovered by performing an XOR operation over the remaining data in combination with the diagonal parity data $P4_{Hor}$ for this horizontal line. Thus, the missing data (i.e., V2-4) can be recovered by performing an XOR operation using the parity data $P4_{Hor}$ in combination with block V1-4 of the first column, block V3-4 of the third column, and the block V4-4 in the fourth column.

At this point, all of the data has been recovered that had gone missing from the fourth row. The same process can be performed to recover the data in the third row, then the second row, and then the top row. It is noted that instead of starting from the bottom row and working upwards, the same process can be performed from the top row and working downwards.

In some embodiments, the process can be parallelized, so that multiple lines are concurrently processed for data recovery. This is because each line with a missing data item can be recovered independently from one another. As a result, multiple concurrent processing can be performed for recover each of those lines.

Figure 12:
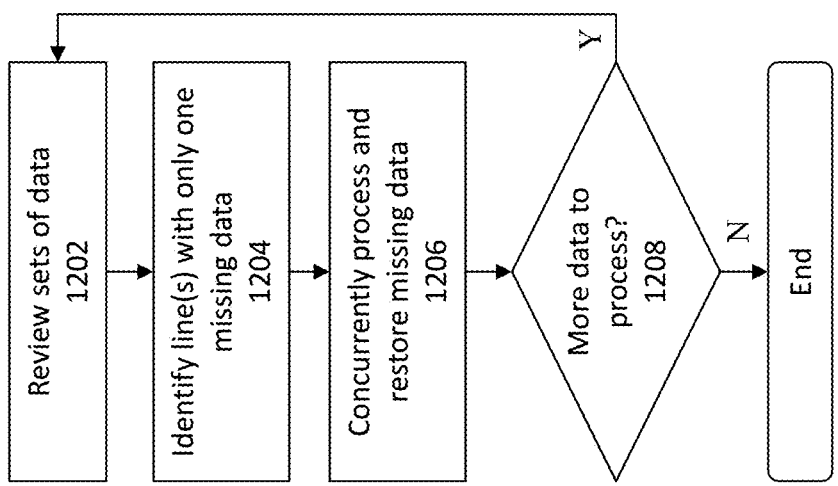
FIG. 12 shows a flowchart of an approach to recover from failure of multiple storage units in a parallelized manner.

FIG. 12 shows a flowchart of an approach to recover from failure of multiple storage units in a parallelized manner. At 1202, the set of data/storage units after the failure is reviewed. This action is taken to determine the extent of the data loss that needs to be addressed.

Next, at 1204, identification is made of the lines of data for which there is only a single block of data that has been lost. This creates a set of work that can be handled in parallel by multiple processing entities.

A 1206, some or all of the missing data for the identified lines are concurrently processed. Numerous approaches can be taken to perform this step in parallel. One way is to have a first thread of execution start processing from the top row, while another begins processing from the bottom row. Another approach is to identify all lines having only a single missing block, and to have those lines placed into a queue for processing. Any available worker entities (e.g., process or thread) can take a line from the queue for processing.

Once the worker has finished processing, the overall set of data can be updated, e.g., so that lines which previously had two or more missing blocks may now be in the position of only having a single missing data item.

At 1208, a determination is made whether there are any further lines to process. If so, then the process loops back through the previous steps to recover the lost data.

As noted above, the invention is applicable to both software-based storage units as well as hardware-based storage units. Applying the invention to the file system or application level is particularly advantageous when used in storage systems that manage storage using software-defined storage units, particularly when then software-based storage systems do not guarantee alignment of its storage to disk drive boundaries. In such systems, erasure coding schemes that rely only upon hardware-based boundaries (such as many common Reed-Solomon approaches) would fail since they erroneously assume that the disk drives fail independently—which may be a false assumption in software-defined storage systems.

The embodiments of the present invention are particularly applicable when used in conjunction with storage virtualization appliances/devices for a datacenter. Set forth below is a description of an example storage architecture that can be used in conjunction with some embodiments of the invention.

Figure 13:
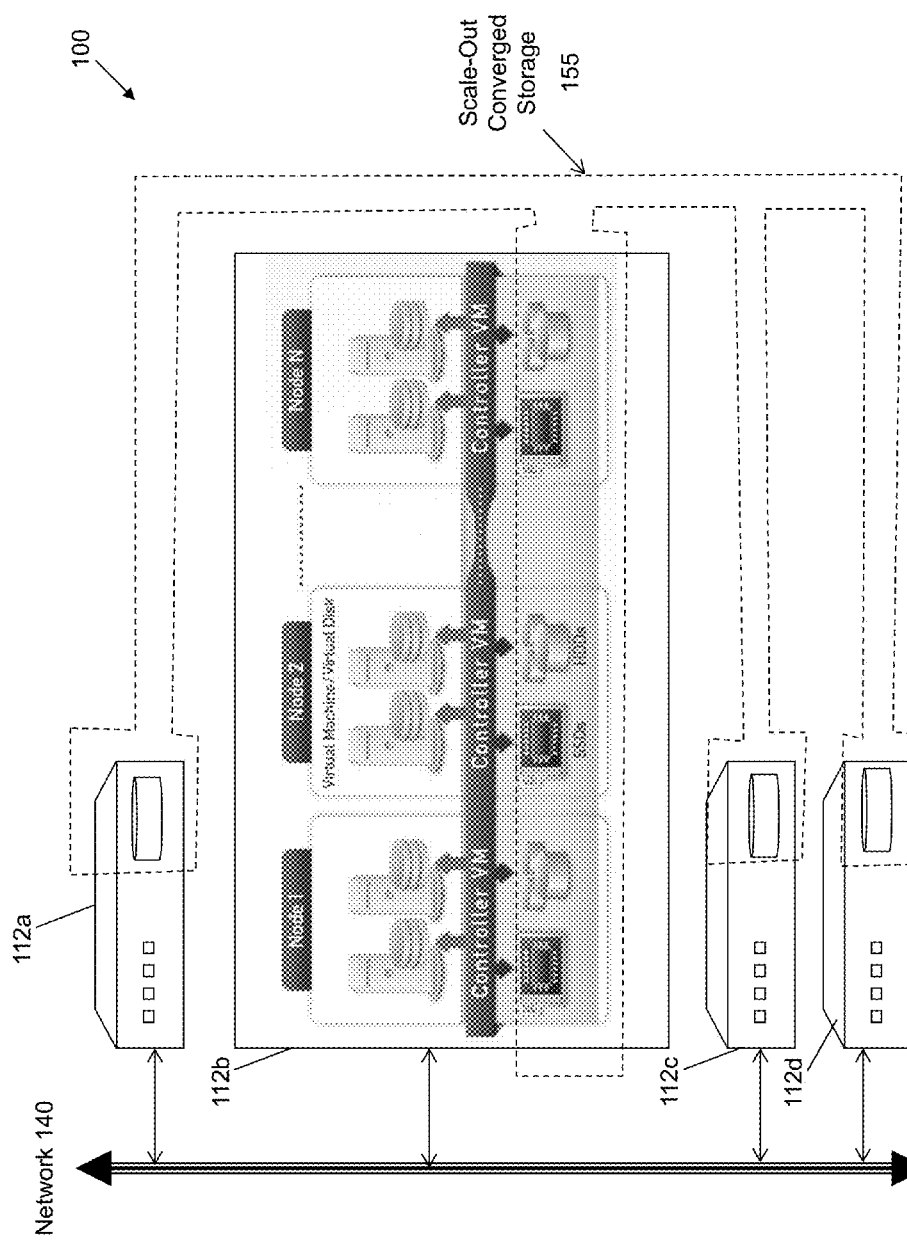
FIG. 13 shows an integrated collection (or "cluster") of virtualization appliances/devices.

FIG. 13 shows an integrated collection (or "cluster") 100 of virtualization appliances/devices 112a, 112b, 112c, and 112d. Each of the devices includes hardware and software to implement a virtualization solution. For example, device 112b is internally organized to include hardware and software to implement multiple virtualization nodes. Each node runs a standard hypervisor on hardware that contains processors, memory and local storage, such as a mix of SSDs and/or hard disk drives. Each node runs virtual machines just like a standard virtual machine host. In addition, local storage from all nodes is virtualized into a unified storage pool, which is referred to herein as "scale-out converged storage" or "SOCS" 155. As described in more detail below, SOCS 155 acts like an advanced SAN that uses local SSDs and disks from all nodes to store virtual machine data. Virtual machines running on the cluster write data to SOCS as if they were writing to a SAN. SOCS is VM-aware and provides advanced data management features. This approach brings the data closer to virtual machines by storing the data locally on the system (if desired), resulting in higher performance at a lower cost.

While traditional SAN solutions typically have 1, 2, 4 or 8 controllers, an n-node system according to the present embodiment has n controllers. Every node in the cluster runs a special virtual machine, called a Controller VM (or "service VM"), which acts as a virtual controller for SOCS. All Controller VMs in the cluster communicate with each other to form a single distributed system. Unlike traditional SAN/NAS solutions that are limited to a small number of fixed controllers, this architecture continues to scale as more nodes are added.

Figure 14:
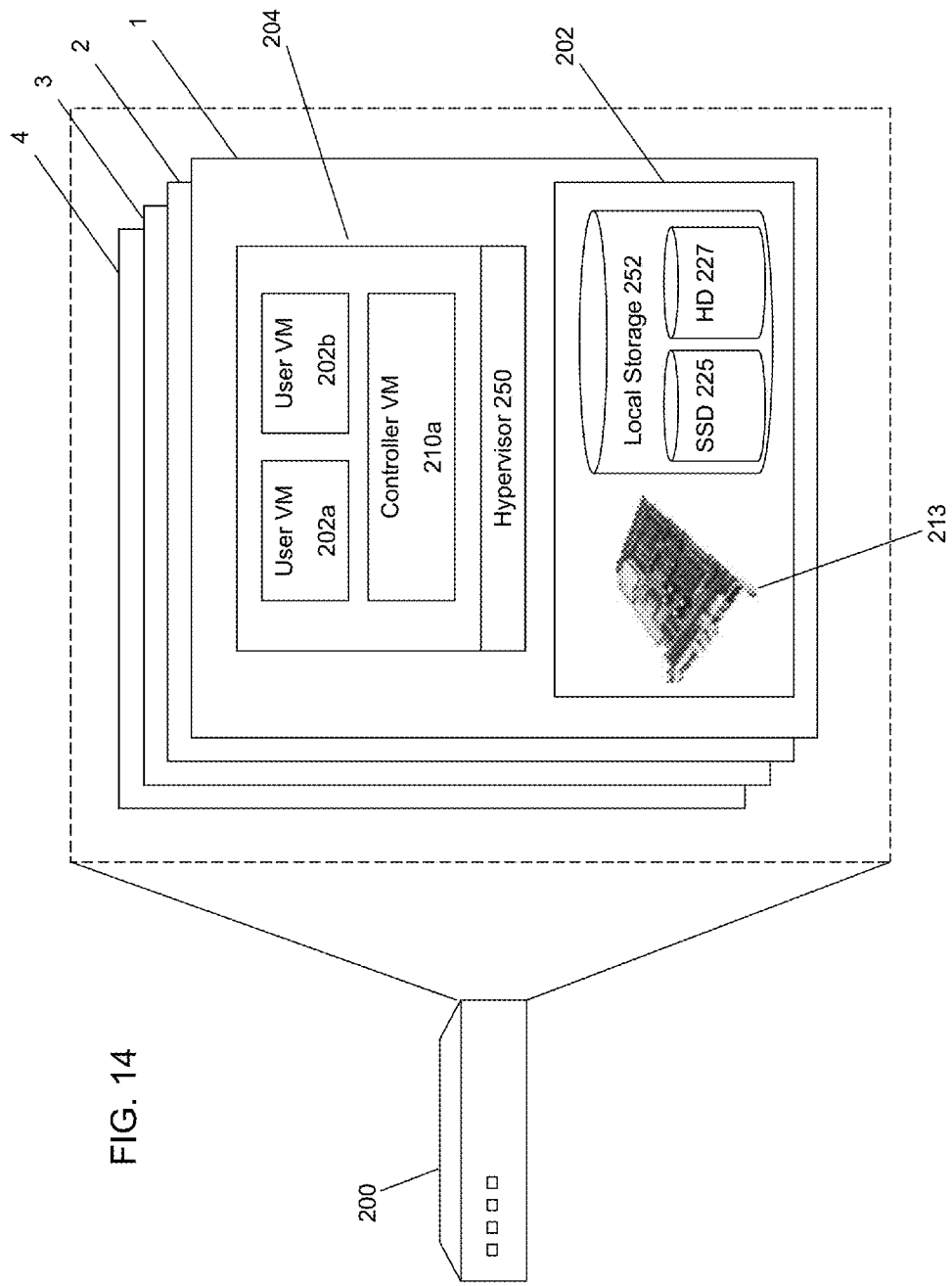
FIG. 14 illustrates a device configured to include a sufficient collection of hardware and software to provide a self-contained virtualization appliance.

Each device can be configured to include a sufficient collection of hardware and software to provide a self-contained virtualization appliance, e.g., as shown in FIG. 14. The example device 200 in FIG. 14 includes four nodes 1-4. Having the multiple nodes within a device allows both high performance and reliability. Performance is increased since there are multiple independent nodes to handle the virtualization needs of the system. Reliability is improved since the multiple nodes provide for redundancy in the event of a possible hardware or software error. Moreover, as discussed below, the software-based storage management solution allow for easy movement of data as the storage needs of the system changes.

Each node in the device includes both hardware components 202 and software components 204 to implement virtualization. Hardware components 202 includes processing capacity (e.g., using one or more processors) and memory capacity (e.g., random access memory or RAM) on a motherboard 213. The node also comprises local storage 252, which in some embodiments include Solid State Drives (henceforth "SSDs") 225 and/or Hard Disk Drives (henceforth "HDDs" or "spindle drives") 227. Any combination of SSDs and HDDs may be used to implement the local storage 252.

The software 204 includes a hypervisor 250 to manage the interactions between the underlying hardware 202 and the one or more user VMs 202a and 202b that run client software. A controller VM 210a exists on each node to implement distributed storage management of the local storage 222, such that the collected local storage for all nodes can be managed as a combined SOCS.

Figure 15:
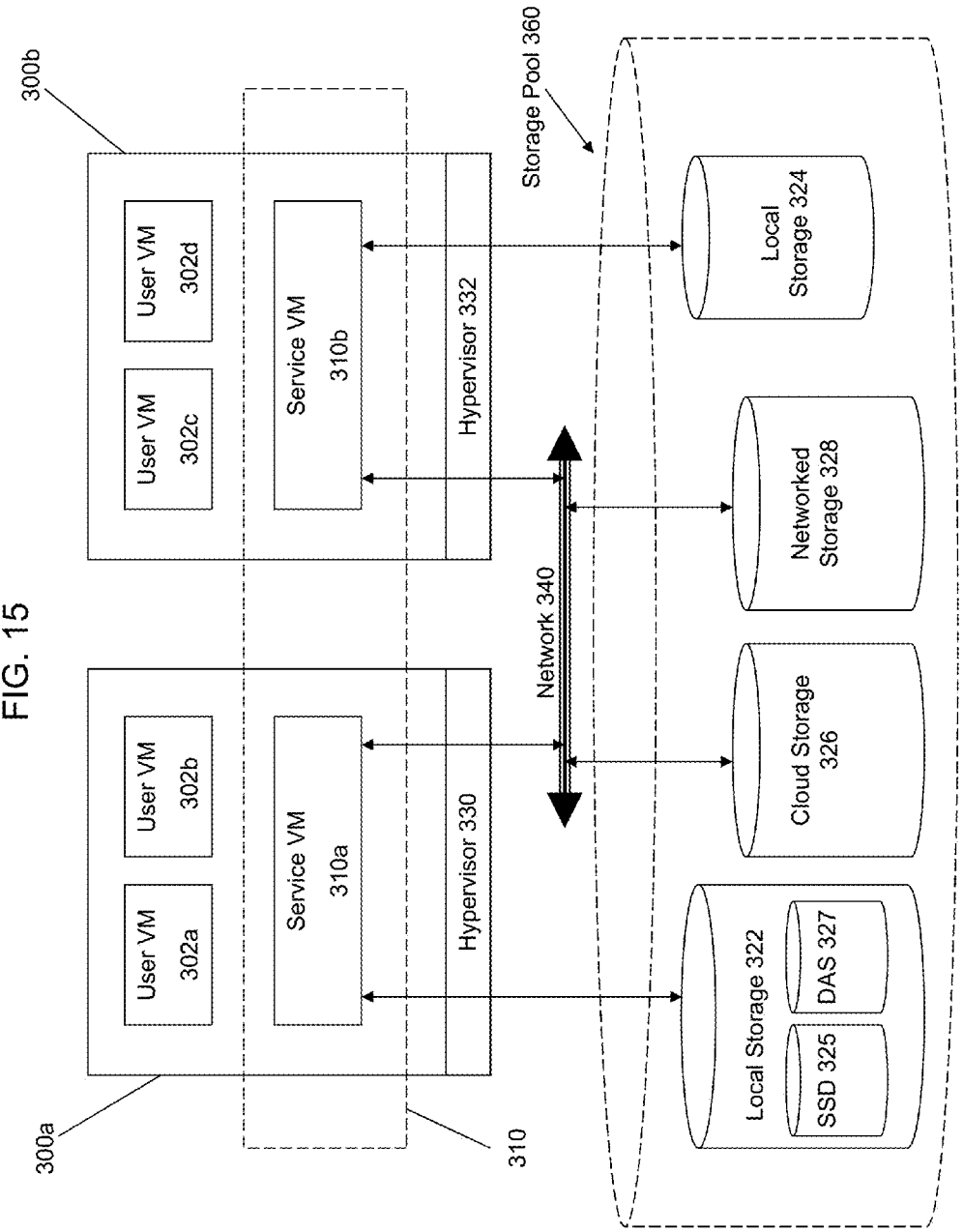
FIG. 15 illustrates an approach for implementing SOCS-based storage management in a virtualization environment.

FIG. 15 illustrates an approach for implementing SOCS-based storage management in a virtualization environment according to some embodiments of the invention. The architecture of FIG. 15 can be implemented for a distributed platform that contains multiple nodes/servers 300a and 300b that manages multiple-tiers of storage. The nodes 300a and 300b may be within the same device, or on different devices in a clustered environment of multiple devices. The multiple tiers of storage include storage that is accessible through a network 340, such as cloud storage 326 or networked storage 328 (e.g., a SAN or "storage area network"). In addition, the present embodiment also permits local storage 322/324 that is within or directly attached to the server and/or appliance to be managed as part of the storage pool 360. As noted above, examples of such storage include any combination of SSDs 325 and/or HDDs 327. These collected storage devices, both local and networked, form a storage pool 360.

Virtual disks (or "vDisks") can be structured from the storage devices in the storage pool 360. As used herein, the term vDisk refers to the storage abstraction that is exposed by a Controller VM to be used by a user VM. In some embodiments, the vDisk is exposed via iSCSI ("internet small computer system interface") or NFS ("network file system") and is mounted as a virtual disk on the user VM. Each server 300a or 300b runs virtualization software, such as VMware ESX(i), Microsoft Hyper-V, or RedHat KVM. The virtualization software includes a hypervisor 330/332 to manage the interactions between the underlying hardware and the one or more user VMs 302a, 302b, 302c, and 302d that run client software.

In some embodiments of the invention, the basic unit of processing for certain storage operations is the extent, which is a contiguous portion of storage on a given storage device. Multiple extents can be collected together and stored within an "extent group." In some embodiments, an extent group corresponds to a single file managed by the underlying filesystem. Thus, the embodiment would utilize a filesystem (e.g., a Linux filesystem) to manage files, where the files correspond to the extent groups to store a set of individual extents.

Controller VM 310a/310b (also referred to herein as "service VMs") are used to manage storage and I/O activities. This is the distributed "Storage Controller" in the currently described architecture. Multiple such storage controllers coordinate within a cluster to form a single-system. The Controller VMs 310a/310b are not formed as part of specific implementations of hypervisors 330/332. Instead, the Controller VMs run as virtual machines above hypervisors 330/332 on the various nodes/servers 302a and 302b, and work together to form a distributed system 310 that manages all the storage resources, including the locally attached storage 322/324, the networked storage 328, and the cloud storage 326. Since the Controller VMs run above the hypervisors 330/332, this means that the current approach can be used and implemented within any virtual machine architecture, since the Controller VMs of embodiments of the invention can be used in conjunction with any hypervisor from any virtualization vendor.

Each Controller VM 310a-b exports one or more block devices or NFS server targets that appear as disks to the client VMs 302a-d. These disks are virtual, since they are implemented by the software running inside the Controller VMs 310a-b. Thus, to the user VMs 302a-d, the Controller VMs 310a-b appear to be exporting a clustered storage device that contains some disks. All user data (including the operating system) in the client VMs 302a-d resides on these virtual disks.

Figure 16:
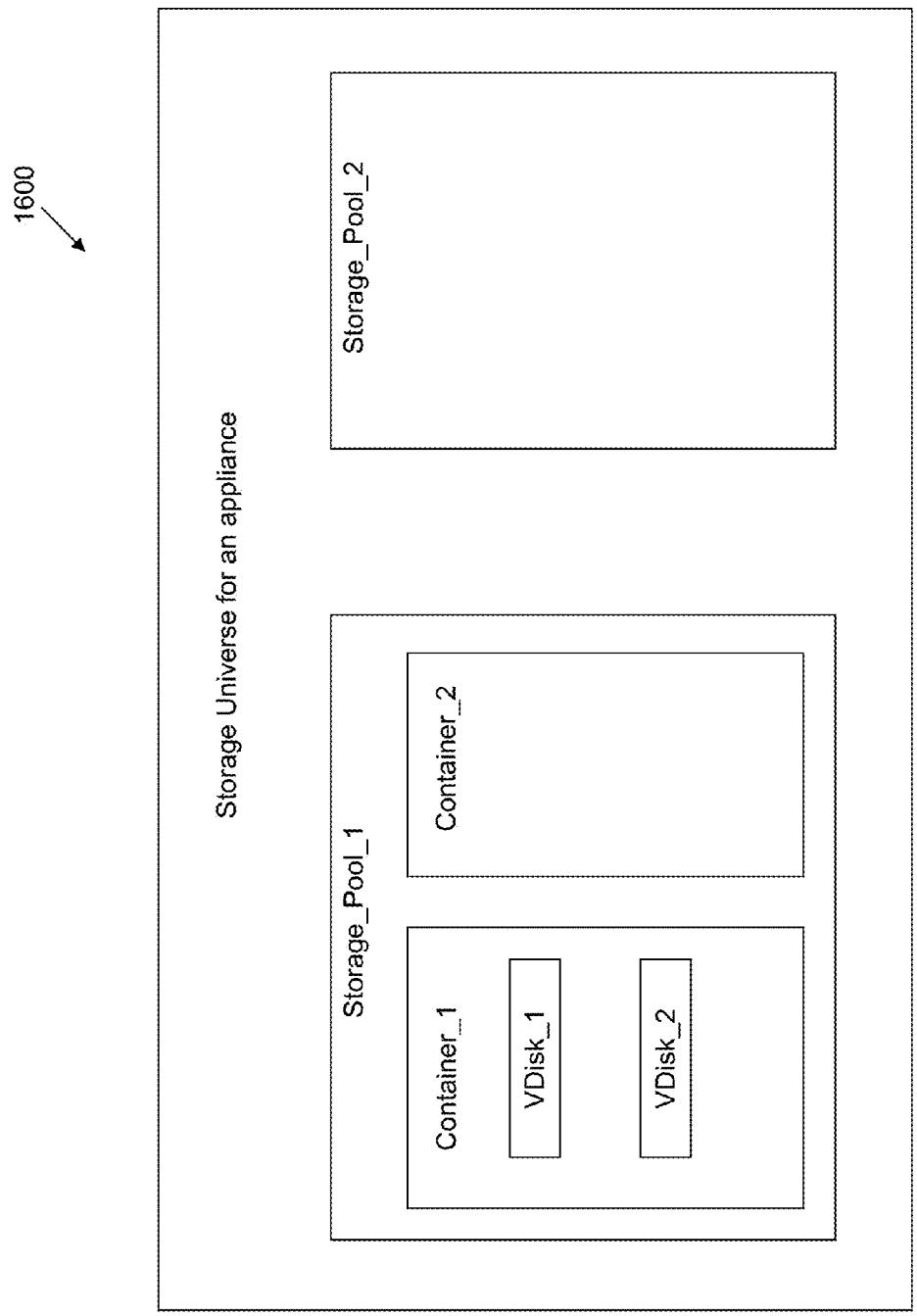
FIG. 16 illustrates the storage hierarchy of the storage objects.

For management of the device, the storage is divided up into abstractions that have a hierarchical relationship to each other. FIG. 16 illustrates the storage hierarchy 1600 of the storage objects according to some embodiments of the invention, where all storage in the storage appliance collectively forms a storage universe. These storage devices may encompass any suitable devices, such as SSDs, HDDs on the various servers ("server-internal" or local storage), SAN, and Cloud storage.

Storage with similar characteristics is classified into tiers. Thus, all SSDs can be classified into a first tier and all HDDs may be classified into another tier etc. In a heterogeneous system with different kinds of HDDs, one may classify the disks into multiple HDD tiers. This action may similarly be taken for SAN and cloud storage.

The storage universe is divided up into storage pools—essentially a collection of specific storage devices. An administrator may be responsible for deciding how to divide up the storage universe into storage pools. For example, an administrator may decide to just make one storage pool with all the disks in the storage universe in that pool. However, the principal idea behind dividing up the storage universe is to provide mutual exclusion—fault isolation, performance isolation, administrative autonomy—when accessing the disk resources.

As noted above, the Controller VM is the primary software component within the server that virtualizes I/O access to hardware resources within a storage pool according to embodiments of the invention. This approach essentially provides for a separate and dedicated controller for each and every node within a virtualized data center (a cluster of nodes that run some flavor of hypervisor virtualization software), since each node will include its own Controller VM. This is in contrast to conventional storage architectures that provide for a limited number of storage controllers (e.g., four controllers) to handle the storage workload for the entire system, and hence results in significant performance bottlenecks due to the limited number of controllers.

Figure 17:
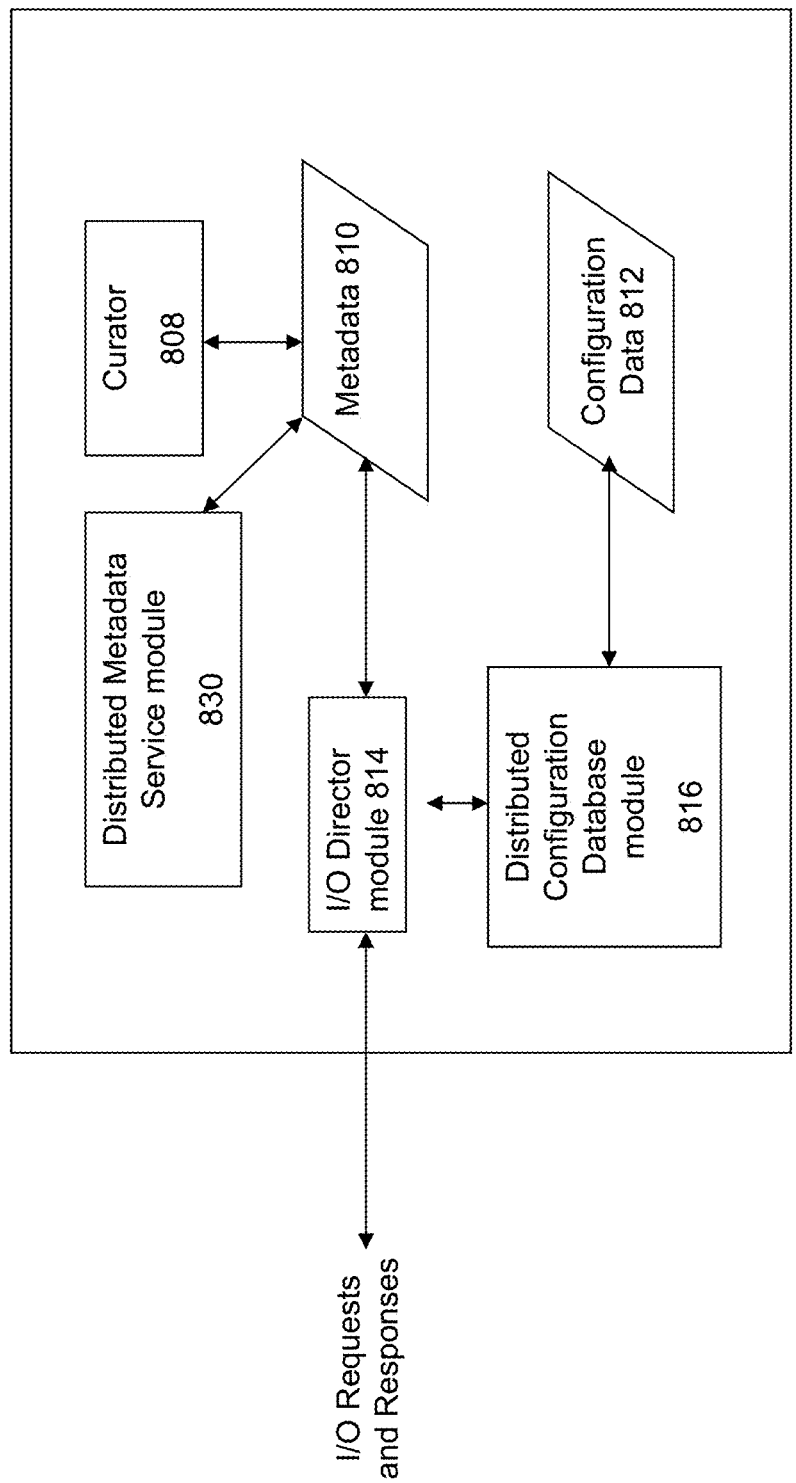
FIG. 17 illustrates the internal structures of a Controller VM according to some embodiments of the invention.

FIG. 17 illustrates the internal structures of a Controller VM according to some embodiments of the invention. As previously noted, the Controller VMs are not formed as part of specific implementations of hypervisors. Instead, the Controller VMs run as virtual machines above hypervisors on the various nodes. Since the Controller VMs run above the hypervisors, this means that the current approach can be used and implemented within any virtual machine architecture, since the Controller VMs of embodiments of the invention can be used in conjunction with any hypervisor from any virtualization vendor. Therefore, the Controller VM can be configured to operate ubiquitously anywhere within the computing environment, and will not need to be custom-configured for each different type of operating environment. This is particularly useful because the industry-standard iSCSI or NFS protocols allow the Controller VM to be hypervisor-agnostic.

The main entry point into the Controller VM is the central controller module 814 (which is referred to here as the "I/O Director module 814"). The term I/O Director module is used to connote that fact that this component directs the I/O from the world of virtual disks to the pool of physical storage resources. In some embodiments, the I/O Director module implements the iSCSI or NFS protocol server.

A write request originating at a user VM would be sent to the iSCSI or NFS target inside the controller VM's kernel. This write would be intercepted by the I/O Director module 814 running in user space. I/O Director module 814 interprets the iSCSI LUN or the NFS file destination and converts the request into an internal "vDisk" request (e.g., as described in more detail below). Ultimately, the I/O Director module 814 would write the data to the physical storage.

Each vDisk managed by a Controller VM corresponds to a virtual address space forming the individual bytes exposed as a disk to user VMs. Thus, if the vDisk is of size 1 TB, the corresponding address space maintained by the invention is 1 TB. This address space is broken up into equal sized units called vDisk blocks. Metadata 810 is maintained by the Controller VM to track and handle the vDisks and the data and storage objects in the system that pertain to the vDisks. The Metadata 810 is used to track and maintain the contents of the vDisks and vDisk blocks.

In order to determine where to write and read data from the storage pool, the I/O Director module 814 communicates with a Distributed Metadata Service module 830 that maintains all the metadata 810. In some embodiments, the Distributed Metadata Service module 830 is a highly available, fault-tolerant distributed service that runs on all the Controller VMs in the appliance. The metadata managed by Distributed Metadata Service module 830 is itself kept on the persistent storage attached to the appliance. According to some embodiments of the invention, the Distributed Metadata Service module 830 may be implemented on SSD storage.

Since requests to the Distributed Metadata Service module 830 may be random in nature, SSDs can be used on each server node to maintain the metadata for the Distributed Metadata Service module 830. The Distributed Metadata Service module 830 stores the metadata that helps locate the actual content of each vDisk block. If no information is found in Distributed Metadata Service module 830 corresponding to a vDisk block, then that vDisk block is assumed to be filled with zeros. The data in each vDisk block is physically stored on disk in contiguous units called extents. Extents may vary in size when de-duplication is being used. Otherwise, an extent size coincides with a vDisk block. Several extents are grouped together into a unit called an extent group. An extent group is then stored as a file on disk. The size of each extent group is anywhere from 16 MB to 64 MB. In some embodiments, an extent group is the unit of recovery, replication, and many other storage functions within the system.

Further details regarding methods and mechanisms for implementing a Controller VM are described below and in related U.S. Pat. No. 8,601,473, entitled "Architecture for Managing I/O and Storage for a Virtualization Environment", which is hereby incorporated by reference in its entirety. Further details regarding methods and mechanisms for implementing Metadata 910 are described below and in related U.S. Pat. No. 8,850,130, entitled "Metadata for Managing I/O and Storage for a Virtualization Environment", which is hereby incorporated by reference in its entirety.

A health management module 808 (which may hereinafter be referred to as a "Curator") is employed to address and cure any inconsistencies that may occur with the Metadata 810. The Curator 808 oversees the overall state of the virtual storage system, and takes actions as necessary to manage the health and efficient performance of that system. According to some embodiments of the invention, the curator 808 operates on a distributed basis to manage and perform these functions, where a master curator on a first server node manages the workload that is performed by multiple slave curators on other server nodes. MapReduce operations are performed to implement the curator workload, where the master curator may periodically coordinate scans of the metadata in the system to manage the health of the distributed storage system. Further details regarding methods and mechanisms for implementing Curator 808 are disclosed in related U.S. Pat. No. 8,549,518, entitled "Method and System for Implementing a Maintenance Service for Managing I/O and Storage for a Virtualization Environment", which is hereby incorporated by reference in its entirety.

Some of the Controller VMs also includes a Distributed Configuration Database module 816 to handle certain administrative tasks. The primary tasks performed by the Distributed Configuration Database module 816 are to maintain configuration data 812 for the Controller VM and act as a notification service for all events in the distributed system. Examples of configuration data 812 include, for example, (1) the identity and existence of vDisks; (2) the identity of Controller VMs in the system; (3) the physical nodes in the system; and (4) the physical storage devices in the system. For example, assume that there is a desire to add a new physical disk to the storage pool. The Distributed Configuration Database module 816 would be informed of the new physical disk, after which the configuration data 812 is updated to reflect this information so that all other entities in the system can then be made aware for the new physical disk. In a similar way, the addition/deletion of vDisks, VMs and nodes would be handled by the Distributed Configuration Database module 816 to update the configuration data 812 so that other entities in the system can be made aware of these configuration changes.

Another task that is handled by the Distributed Configuration Database module 816 is to maintain health information for entities in the system, such as the Controller VMs. If a Controller VM fails or otherwise becomes unavailable, then this module tracks this health information so that any management tasks required of that failed Controller VM can be migrated to another Controller VM.

The Distributed Configuration Database module 816 also handles elections and consensus management within the system. Another task handled by the Distributed Configuration Database module is to implement ID creation. Unique IDs are generated by the Distributed Configuration Database module as needed for any required objects in the system, e.g., for vDisks, Controller VMs, extent groups, etc. In some embodiments, the IDs generated are 64-bit IDs, although any suitable type of IDs can be generated as appropriate for embodiment according to the invention. According to some embodiments of the invention, the Distributed Configuration Database module 816 may be implemented on an SSD storage because of the real-time guarantees required to monitor health events.

The vDisks can either be unshared (read and written by a single user VM) or shared (accessed by multiple user VMs or hypervisors) according to embodiments of the invention. In the shared vDisk scenario, in which a vDisk can be accessed by multiple user VMs on different server nodes. In some examples, the shared vDisk is owned by a first Controller VM on a first server node, and therefore all I/O requests for the shared vDisk will be directed to this first Controller VM using standard IP forwarding (Network Address Translation) rules in the networking stack of the Controller VMs. For I/O requests from a user VM that resides on the same server node, the process to handle the I/O requests is straightforward, and is conducted as described above. Essentially, the I/O request is in the form of an iSCSI or NFS request that is directed to a given IP address. The IP address for the I/O request is common for all the Controller VM on the different server nodes, but VLANs allows the IP address of the iSCSI or NFS request to be private to a particular (local) subnet, and hence the I/O request will be sent to the local Controller VM to handle the I/O request. Since local Controller VM recognizes that it is the owner of the vDisk which is the subject of the I/O request, the local Controller VM will directly handle the I/O request.

With regards to erasure coding and to understand the differences brought about by software-defined storage, consider conventional RAID methods used in ordinary disk array systems. For example, in a RAID 4 systems having a set of four disks, three of the disks are used to store user data while the fourth disk is used to store the exclusive OR parity data. Disks are striped into blocks of reasonable size such that it is necessary to update only one parity block when a user data block is updated. If one of the disks fails, its blocks are recovered as the exclusive OR of the blocks of the same stripe. RAID 5 spreads parity blocks across all disks, but it is otherwise identical to the RAID 4 approach. RAID 6 distributes parity data across all disks. This approach computes two parity blocks for each stripe of user data blocks. The first parity is identical to the exclusive OR parity used by RAID 4 and RAID 5. There are several methods used to compute the second parity. The most general method that has been known for some time carries the last names of its inventors Reed and Solomon. The Reed-Solomon method can be used to compute and store any number of parity blocks $K>=2$ to tolerate up to K failures.

In a software-based storage system, each node may have several physical disks attached to that node. It is possible to think of every physical drive as an independent unit of failure, but quite often the whole node and thus all disk drives become unavailable. This makes a node a reasonable choice of a unit of failure for erasure coding in such systems. The description of FIGS. 13-17 above provides an example environment in which a node may include multiple storage devices attached to that node.

To gainfully apply erasure coding, one can select a reasonable number of blocks $B_1 \ldots B_m$ such that they are all either already stored or will have been stored on distinct nodes. The number of such blocks M should be less than N (the number of nodes in the cluster) by at least the fault tolerance degree K because the parity blocks $B_{P1} \ldots B_{Pk}$ will be stored on distinct nodes as well. Should one of the nodes fail, it would be advantageous to have an available node which was not used to store any of the information blocks or parity blocks, such that the system could store the decoded block and from there on be prepared for another failure. Ideally, M should be chosen such that $M+K<=N-K$ to place K decoded blocks after a failure of K nodes.

Figure 18A:
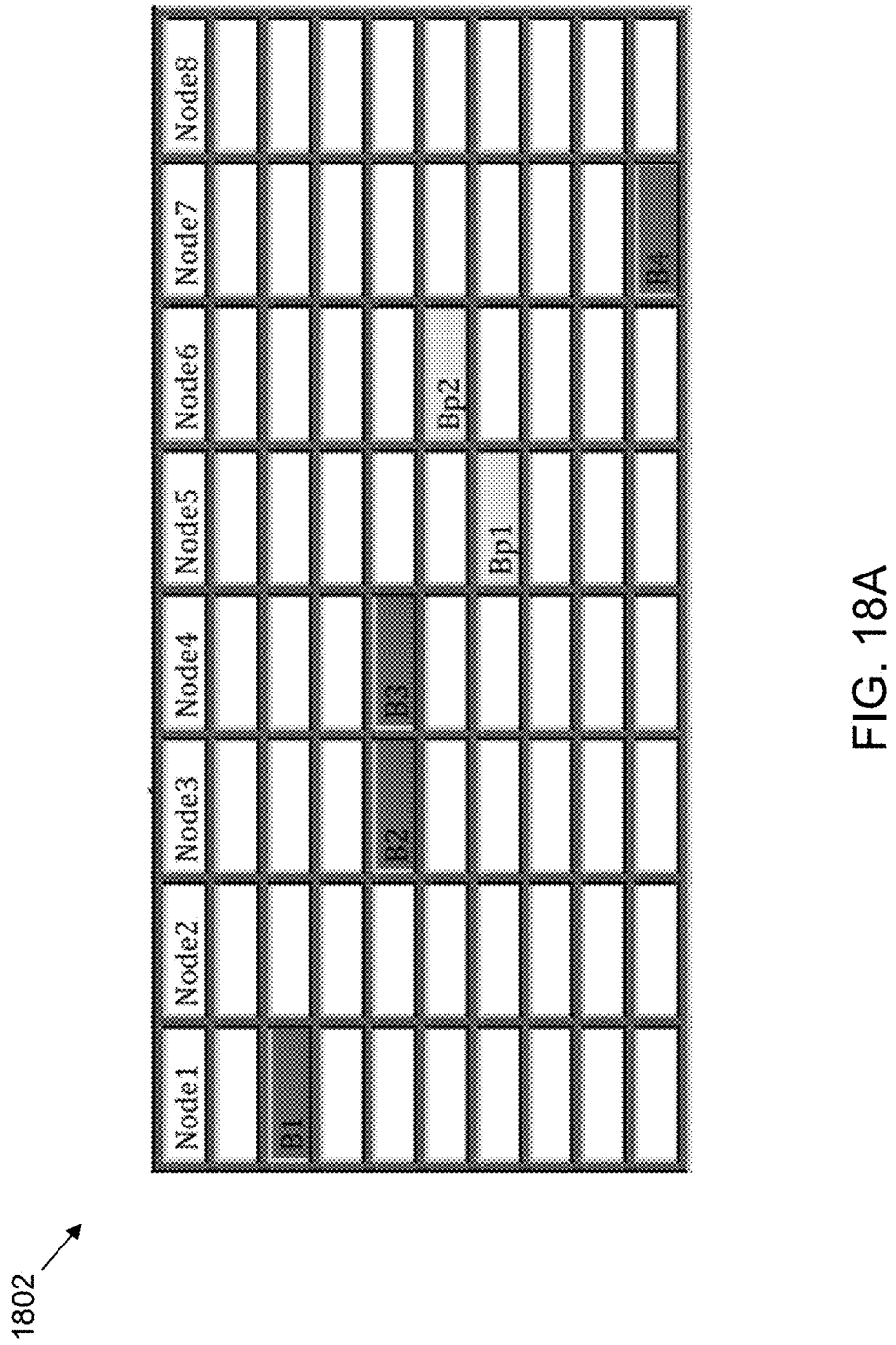
FIGS. 18A and 18B illustrate erasure coding.

FIG. 18A shows a matrix 1802 that illustrates an eight node cluster (N=8) where four information blocks (M=4) have been chosen to be stored by four distinct nodes and computed two parity blocks (K=2). The parity blocks have been placed on two of the remaining four nodes that did not store any of the chosen information blocks.

Figure 18B:
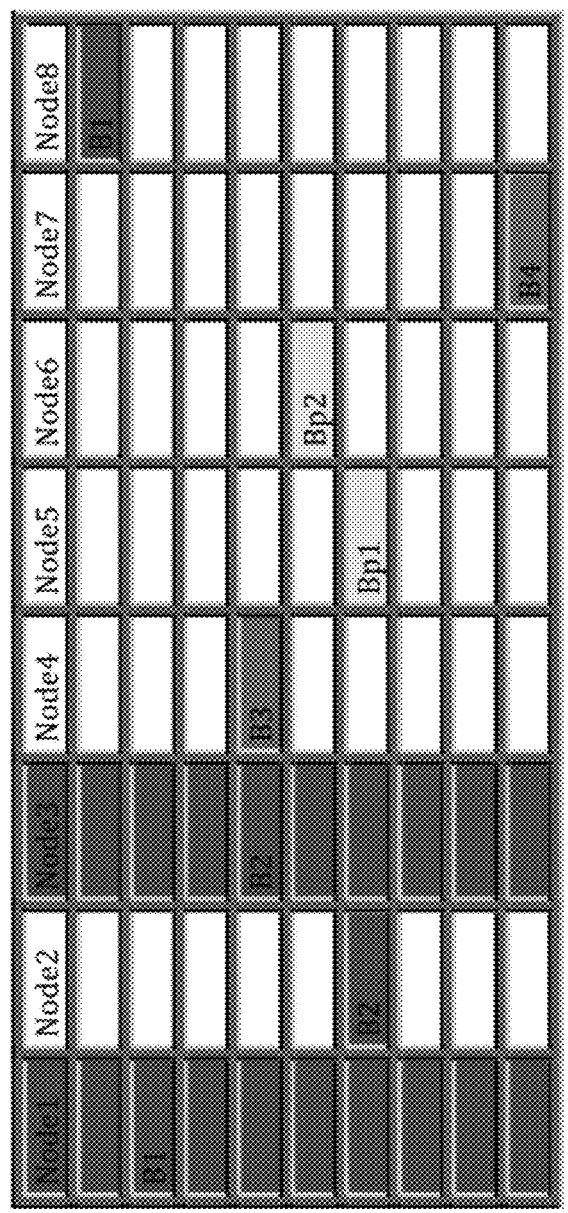

In the event of a two-node failure, the blocks stored on the failed nodes are decoded and placed on available nodes not used to store any of the blocks involved. For example, if nodes 1 and 3 from the above example have become unavailable, blocks $B_1$ and $B_2$ stored by the lost nodes will be decoded from $B_3$, $B_4$, $B_{p1}$, $B_{p2}$ and placed on the two remaining live nodes (2 and 8) that are not used to store any of the blocks. This situation is shown in matrix 1804 of FIG. 18B.

Traditional RAID schemes stripe disk space into uniform blocks, so that all blocks are erasure-coded and it is always possible for each block to determine where other blocks encoded together with this block are located. It is difficult to follow this method in software-based storage systems because the software system delegates the task of writing extent store files to the native file system. Instead, the present embodiment uses the existing data partitioning in an extent store (e.g., extent groups) by monitoring extent group usage and selecting suitable ones for erasure coding.

In some embodiments, erasure coding is applied to data that is only infrequently modified or that has not been modified for a long time without changing its location, to avoid or minimize re-computation of parity blocks.

The erasure coding approach is described above and operates by implementing multiple sets of parity data, where number of parity corresponds to the amount of failure to be tolerated by the storage system. For example, if there is a set of four storage units to be protected from failure, and the storage system is expected to be able to tolerate a failure of three of the storage units, then there will be three sets of parity data that are created to protect against the possible failures. The set of parity data may include multiple sets of diagonal parity data. The erasure coding approach of the present invention can generally protect against any number of storage unit failures. For example, in one embodiment, the inventive approach protects from up to three failures, while requiring less computation than is required by the Reed-Solomon algorithm. The embodiments of the invention uses independently computed parity blocks, as opposed to using some parity blocks as input values in computations of other parity blocks, and does not have the restriction imposed by many efficient algorithms that N+1 must be a prime number as is required by some conventional techniques.

In some embodiments, storage units correspond to software abstractions (such as files), and the "block" used in the erasure coding approach correspond to an extent group. An "information block" pertains to a regular block containing user data. A parity block corresponds to an additional block containing parity data. An "erasure strip" corresponds to an ordered set of information and parity blocks encoded together.

The storage system will consider all extent groups with at least a designated time period passed after the last write operation to the extent group for erasure coding.

A container configuration parameter erasure_code="n/k" can be configured, which specifies the number of information blocks n and the number of parity block k in each erasure strip. Extent groups with the same value of the container parameter erasure_code="n/k" may be encoded together even if they do not belong to the same container. The goal is to generate as many strips of n extent groups such that their primary replicas reside on distinct nodes. The primary replica will survive erasure coding, whereas all other replicas will be removed upon successful completion of erasure coding for the whole strip.

Erasure coding is implemented by an operation defined by the following three vectors:

Extent group ids which identify information blocks
Vdisk ids which own the extent groups
Disk ids of the primary replicas The encoding operation reads data from all information blocks into buffer objects and computes parity data. The parity blocks are then written out to new extent groups. After the parity block data and metadata are successfully written, control blocks of the information extent groups are updated. Finally, all replicas of the information extent groups except the primary replicas are removed.

The erasure coding operation is aborted if anything goes wrong in the middle. For example, if data or metadata of one of the extent groups is modified while processing the request, a CAS (compare and swap) error may be reported.

Erasure decoding is performed when the primary replica is not available. It may be triggered by the extent group fixer operation in which case the full contents of the primary replica is decoded. Once the primary replica is restored, all further operations will read data from the primary replica. Partial decoding is triggered by read operations from an extent group which lost all its replicas. The result of partial decoding is used to satisfy the user read request. It may also be cached in the extent cache. Partial decoding results are not written to the extent store.

The erasure decode operation first finds the primary parity extent group from the control group of the extent group being recovered. The control block of the primary parity extent group contains extent group ids of all extent groups on the erasure strip. The decode operation reads data from all available information and parity extent groups. If partial read is being satisfied, the decode operation computes range overlaps with extent group slices, reads only the slices which overlap, and then crops unnecessary ranges and fills in any gaps. The missing data blocks are then decoded from available data blocks.

If the operation is a partial one, the result is returned to the caller in a vector of buffer objects. Full replica decoding proceeds to allocate a replica on an independent unit of failure not involved in hosting the available erasure strip replicas. If new replica allocation is successful, the operation will write parity data and update extent group metadata accordingly.

Erasure coded extent groups may depend on data stored by other extent groups on the same erasure strip. Therefore, any update of data in any of such extent groups may involve re-computation of the parity data. If that extent group becomes actively updated over and over again, parity data re-computation will affect performance in a dramatic way. Instead, the extent being updated can be migrated from the extent group to a new extent group. The old data of the migrated extent is still used for decoding, but it is otherwise garbage data that can be subsequently removed.

Therefore, what has been described is an improved approach to implement erasure coding in an efficient manner, particularly for failures of multiple storage units. The inventive approach is applicable to any type of storage unit, including hardware storage units and software-based storage units.

System Architecture

Figure 20:
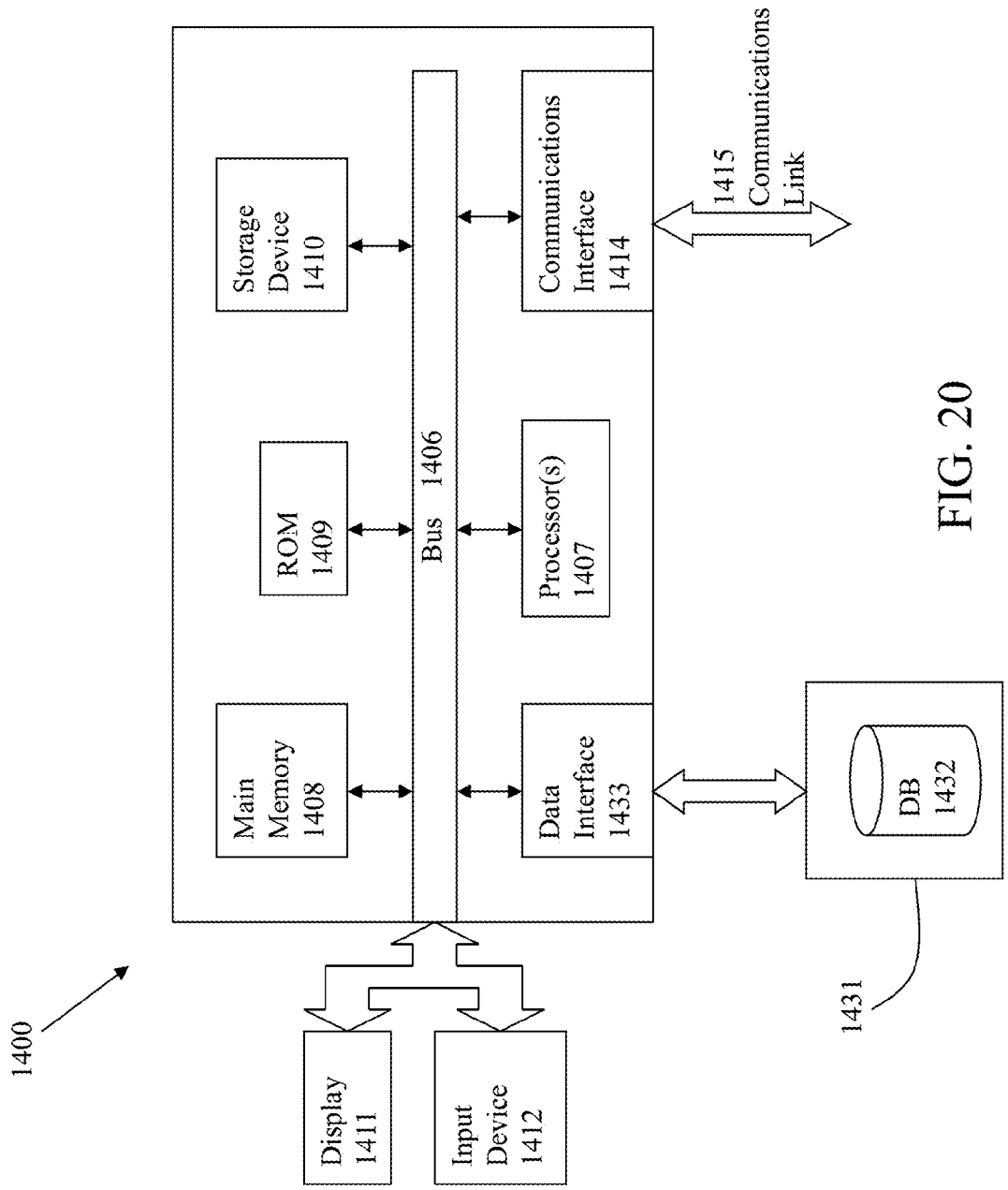
FIG. 20 is a block diagram of a computing system suitable for implementing an embodiment of the present invention.

FIG. 20 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. A database 1432 in a storage medium 1431 may be accessed through a data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method, comprising:
   identifying a plurality of storage units;
   determining a number of storage unit failures to be tolerated;
   configuring a matrix having rows and columns, wherein a first set of columns corresponds to the plurality of storage units and a second set of columns having an amount of columns corresponding to the number of storage unit failures to be tolerated, the second set of columns comprising one or more parity data, wherein a first set of rows corresponds to data from respective storage units and a second set of rows comprising one or more additional rows having preset values, the one or more additional rows corresponding to the number of storage unit failures to be tolerated minus one;
   computing the one or more parity data to populate the second set of columns of the matrix, wherein the one or more parity data comprises a row parity, a first diagonal parity, and a second diagonal parity, wherein the first diagonal parity and the second diagonal parity are computed from the preset values in the one or more additional rows; and wherein the first diagonal parity comprises a different slope from the second diagonal parity.

2. The method of claim 1, wherein the first diagonal parity set comprises an ascending diagonal parity and the second diagonal parity set comprises a descending diagonal parity.

3. The method of claim 1, wherein the one or more additional rows added to the matrix provide enough known values such that lines missing a single block of data can be identified for allowing a recovery of the single block of data via the one or more parity data.

4. The method of claim 1, wherein the storage units comprise software-based storage.

5. The method of claim 4, where the storage unit corresponds to a file or extent group.

6. The method of claim 1, wherein the first diagonal parity and second diagonal parity are negative reciprocals of one another.

7. The method of claim 1, wherein the one or more additional rows are determined based at least in part on a multiple of an absolute value of the slope of the first diagonal parity.

8. The method of claim 1, wherein each of the one or more parity data is computed independently of another parity set.

9. The method of claim 1, wherein a parity set is re-computed in parallel with re-computation of another parity set upon a change to underlying data.

10. The method of claim 1, wherein the first diagonal parity corresponds to multiple slopes.

11. The method of claim 1, wherein the preset values for the one or more additional rows are zeros, and wherein the preset values do not physically consume storage space in the plurality of storage units.

12. A method to recover data, comprising:
identifying a set of storage units having a failure, wherein the set of storage units corresponds to a set of one or more parity data that had been computed and wherein the set of one or more parity data comprises a first diagonal parity set and a second diagonal parity set, and wherein data within the set of storage units are organized as a matrix having rows and columns with one or more additional rows having preset values, wherein an amount of the one or more additional rows added to the matrix corresponds to a number of storage unit failures to be tolerated minus one;
identifying a line of data having a single missing data, wherein the single missing data within the line of data is identifiable based at least in part on the amount of the one or more additional rows having preset values being added to the matrix when computing the one or more parity data comprising diagonal parity data; and
computing the single missing data by considering a parity data from the one or more parity data for the line in combination with known data in the line.

13. The method of claim 12, wherein the first diagonal parity set comprises an ascending diagonal parity and the second diagonal parity set comprises a descending diagonal parity.

14. The method of claim 12, wherein the amount of the one or more additional rows added to the matrix provides enough known values such that lines missing a single data can be identified for allowing a recovery of the single data via the one or more parity data.

15. The method of claim 12, wherein a row in the matrix is recovered by first recovering with the first diagonal parity set, followed by using the second diagonal parity set, and then followed by using a row parity set.

16. The method of claim 12, wherein the storage units comprise software-based storage.

17. The method of claim 12, wherein the first diagonal parity set comprises a diagonal parity having a different slope from the second diagonal parity set.

18. The method of claim 12, wherein the set of one or more parity data comprises a row parity set.

19. The method of claim 12, wherein recovery is performed in parallel by concurrently performing recovery on data from a top row having missing data and on data from a bottom row having missing data.

20. The method of claim 12, wherein recovery is performed in parallel by concurrently processing multiple stripes of data that each has only a single missing data.

21. A computer program product embodied on a non-transitory computer readable medium, the non-transitory computer readable medium having stored thereon a sequence of instructions which, when executed by a processor causes the processor to execute a method for performing a process, comprising:
identifying a plurality of storage units;
determining a number of storage unit failures to be tolerated;
configuring a matrix having rows and columns, wherein a first set of columns corresponds to the plurality of storage units and a second set of columns having an amount of columns corresponding to the number of storage unit failures to be tolerated, the second set of columns comprising one or more parity data, wherein a first set of rows corresponds to data from respective storage units and a second set of rows comprising one or more additional rows having preset values, the one or more additional rows corresponding to the number of storage unit failures to be tolerated minus one;
computing the one or more parity data to populate the second set of columns of the matrix, wherein the one or more parity data comprises a row parity, a first diagonal parity, and a second diagonal parity, wherein the first diagonal parity and the second diagonal parity are computed from the preset values in the one or more additional rows; and
wherein the first diagonal parity comprises a different slope from the second diagonal parity.

22. The computer program product of claim 21, wherein the first diagonal parity set comprises an ascending diagonal parity and the second diagonal parity set comprises a descending diagonal parity.

23. The computer program product of claim 21, wherein the one or more additional rows added to the matrix provide enough known values such that lines missing a single block of data can be identified for allowing a recovery of the single block of data via the one or more parity data.

24. The computer program product of claim 21, wherein the storage units comprise software-based storage.

25. The computer program product of claim 24, where the storage unit corresponds to a file or extent group.

26. The computer program product of claim 21, wherein the first diagonal parity and second diagonal parity are negative reciprocals of one another.

27. The computer program product of claim 21, wherein the one or more additional rows are determined based at least in part on a multiple of an absolute value of the slope of the first diagonal parity.

28. The computer program product of claim 21, wherein each of the one or more parity data is computed independently of another parity set.

29. The computer program product of claim 21, wherein a parity set is re-computed in parallel with re-computation of another parity set upon a change to underlying data.

30. The computer program product of claim 21, wherein the first diagonal parity corresponds to multiple slopes.

31. The computer program product of claim 21, wherein the preset values for the one or more additional rows are zeros, and wherein the preset values do not physically consume storage space in the plurality of storage units.

32. A computer program product embodied on a non-transitory computer readable medium, the non-transitory computer readable medium having stored thereon a sequence of instructions which, when executed by a processor causes the processor to execute a method for performing a process to recover data, comprising:
identifying a set of storage units having a failure, wherein the set of storage units corresponds to a set of one or more parity data that had been computed and wherein the set of one or more parity data comprises a first diagonal parity set and a second diagonal parity set, and wherein data within the set of storage units are organized as a matrix having rows and columns with one or more additional rows having preset values, wherein an amount of the one or more additional rows added to the matrix corresponds to a number of storage unit failures to be tolerated minus one;
identifying a line of data having a single missing data, wherein the single missing data within the line of data is identifiable based at least in part on the one or more additional rows having preset values being added to the matrix when computing the one or more parity data comprising diagonal parity data; and
computing the single missing data by considering a parity data from the one or more parity data for the line in combination with known data in the line.

33. The computer program product of claim 32, wherein the first diagonal parity set comprises an ascending diagonal parity and the second diagonal parity set comprises a descending diagonal parity.

34. The computer program product of claim 32, wherein the amount of the one or more additional rows added to the matrix provides enough known values such that lines missing a single data can be identified for allowing a recovery of the single data via the one or more parity data.

35. The computer program product of claim 32, wherein a row in the matrix is recovered by first recovering with the first diagonal parity set, followed by using the second diagonal parity set, and then followed by using a row parity set.

36. The computer program product of claim 32, wherein the storage units comprise software-based storage.

37. The computer program product of claim 32, wherein the first diagonal parity set comprises a diagonal parity having a different slope from the second diagonal parity set.

38. The computer program product of claim 32, wherein the set of one or more parity data comprises a row parity set.

39. The computer program product of claim 32, wherein recovery is performed in parallel by concurrently performing recovery on data from a top row having missing data and on data from a bottom row having missing data.

40. The method of claim 12, wherein recovery is performed in parallel by concurrently processing multiple stripes of data that each has only a single missing data.

41. A system, comprising:
a computer processor to execute a set of program code instructions;
a memory to hold the program code instructions, in which the program code instructions comprises program code to perform: identifying a plurality of storage units; determining a number of storage unit failures to be tolerated; configuring a matrix having rows and columns, wherein a first set of columns corresponds to the plurality of storage units and a second set of columns having an amount of columns corresponding to the number of storage unit failures to be tolerated, the second set of columns comprising one or more parity data, wherein a first set of rows corresponds to data from respective storage units and a second set of rows comprising one or more additional rows having preset values, the one or more additional rows corresponding to the number of storage unit failures to be tolerated minus one computing the one or more parity data to populate the second set of columns of the matrix, wherein the one or more parity data comprises a row parity, a first diagonal parity, and a second diagonal parity, wherein the first diagonal parity and the second diagonal parity are computed from the preset values in the one or more additional rows; and wherein the first diagonal parity comprises a different slope from the second diagonal parity.

42. The system of claim 41, wherein the first diagonal parity set comprises an ascending diagonal parity and the second diagonal parity set comprises a descending diagonal parity.

43. The system of claim 41, wherein the one or more additional rows added to the matrix provide enough known values such that lines missing a single block of data can be identified for allowing a recovery of the single block of data via the one or more parity data.

44. The system of claim 41, wherein the storage units comprise software-based storage.

45. The system of claim 44, where the storage unit corresponds to a file or extent group.

46. The system of claim 41, wherein the first diagonal parity and second diagonal parity are negative reciprocals of one another.

47. The system of claim 41, wherein the one or more additional rows are determined based at least in part on a multiple of an absolute value of the slope of the first diagonal parity.

48. The system of claim 41, wherein each of the one or more parity data is computed independently of another parity set.

49. The system of claim 41, wherein a parity set is re-computed in parallel with re-computation of another parity set upon a change to underlying data.

50. The system of claim 41, wherein the first diagonal parity corresponds to multiple slopes.

51. The system of claim 41, wherein the preset values for the one or more additional rows are zeros, and wherein the preset values do not physically consume storage space in the plurality of storage units.

52. A system to recover data, comprising:
a computer processor to execute a set of program code instructions; and
a memory to hold the program code instructions, in which the program code instructions comprises program code to perform: identifying a set of storage units having a failure, wherein the set of storage units corresponds to a set of one or more parity data that had been computed and wherein the set of one or more parity data comprises a first diagonal parity set and a second diagonal parity set, and wherein data within the set of storage units are organized as a matrix having rows and columns with one or more additional rows having preset values, wherein an amount of the one or more additional rows added to the matrix corresponds to a number of storage unit failures to be tolerated minus one; identifying a line of data having a single missing data, wherein the single missing data within the line of data is identifiable based at least in part on the one or more additional rows having preset values being added to the matrix when computing the one or more parity data comprising diagonal parity data; and computing the single missing data by considering a parity data from the one or more parity data for the line in combination with known data in the line.

53. The system of claim 52, wherein the first diagonal parity set comprises an ascending diagonal parity and the second diagonal parity set comprises a descending diagonal parity.

54. The system of claim 52, wherein the amount of the one or more additional rows added to the matrix provides enough known values such that lines missing a single data can be identified for allowing a recovery of the single data via the one or more parity data.

55. The system of claim 52, wherein a row in the matrix is recovered by first recovering with the first diagonal parity set, followed by using the second diagonal parity set, and then followed by using a row parity set.

56. The system of claim 52, wherein the storage units comprise software-based storage.

57. The system of claim 52, wherein the first diagonal parity set comprises a diagonal parity having a different slope from the second diagonal parity set.

58. The system of claim 52, wherein the set of one or more parity data comprises a row parity set.

59. The system of claim 52, wherein recovery is performed in parallel by concurrently performing recovery on data from a top row having missing data and on data from a bottom row having missing data.

60. The system of claim 52, wherein recovery is performed in parallel by concurrently processing multiple stripes of data that each has only a single missing data.

61. A method, comprising:
identifying a plurality of storage units, wherein strips are identified from the plurality of storage units;
determining a number of storage unit failures to be tolerated;
configuring a matrix having rows and columns, wherein a first set of columns corresponds to the plurality of storage units and a second set of columns having an amount of columns corresponding to the number of storage unit failures to be tolerated, the second set of columns comprising one or more parity data, wherein a first set of rows corresponds to data from respective storage units and a second set of rows comprising one or more additional rows having preset values, the one or more additional rows corresponding to the number of storage unit failures to be tolerated minus one;
determining a number of preset values for each strip, the number of preset values being the same for each strip; and
computing one or more parity data that corresponds to the number of storage unit failures to be tolerated, wherein the one or more parity data comprises diagonal parity that is computed using the preset values, and wherein the one or more parity data can be computed independently of each other.

62. A method, comprising:
identifying a plurality of storage units;
determining a number of storage unit failures to be tolerated;
configuring a matrix having rows and columns, wherein a first set of columns corresponds to the plurality of storage units and a second set of columns having an amount of columns corresponding to the number of storage unit failures to be tolerated, the second set of columns comprising one or more parity data, wherein a first set of rows corresponds to data from respective storage units and a second set of rows comprising one or more additional rows having preset values, the one or more additional rows corresponding to the number of storage unit failures to be tolerated minus one; and
computing one or more parity data that corresponds to a number of storage unit failures to be tolerated, wherein the one or more parity data comprises a plurality of diagonal parities, the plurality of diagonal parities having different slopes, where parity strip lengths are different for different absolute values of the slopes, and wherein the plurality of diagonal parities are computed from the preset values in the one or more additional rows.

63. A method, comprising:
identifying a plurality of storage units, where the plurality of storage units is represented as a matrix of rows and columns, wherein a first set of columns corresponds to the plurality of storage units and a second set of columns having an amount of columns corresponding to a number of storage unit failures to be tolerated, the second set of columns comprising one or more parity data, wherein a first set of rows corresponds to data from respective storage units and a second set of rows comprising one or more additional rows having preset values, the one or more additional rows corresponding to the number of storage unit failures to be tolerated minus one;
identifying a number of line patterns, wherein the number of line patterns corresponds to the number of storage unit failures to tolerate;
at least one line pattern having multiple slopes within a line; and computing a parity for each line of the number of line patterns, wherein lines with a slope greater than or less than 0 comprise a preset value from the one or more additional rows.

* * * * *